(12) United States Patent
Yamamoto

(10) Patent No.: US 10,562,720 B2
(45) Date of Patent: Feb. 18, 2020

(54) TRANSPORT SYSTEM, PROCESSING SYSTEM, AND CONTROL METHOD OF TRANSPORT SYSTEM

(71) Applicant: CANON KABUSHIKI KAISHA, Tokyo (JP)

(72) Inventor: Takeshi Yamamoto, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/979,341

(22) Filed: May 14, 2018

(65) Prior Publication Data

US 2018/0334338 A1 Nov. 22, 2018

(30) Foreign Application Priority Data

May 17, 2017 (JP) .................................. 2017-098342

(51) Int. Cl.
*B65G 54/02* (2006.01)

(52) U.S. Cl.
CPC .......... *B65G 54/02* (2013.01); *B65G 2203/02* (2013.01)

(58) Field of Classification Search
CPC ........................... B65G 54/02; B65G 2203/02
See application file for complete search history.

(56) References Cited

U.S. PATENT DOCUMENTS

| | | | | |
|---|---|---|---|---|
| 6,876,107 B2* | 4/2005 | Jacobs | .................... | B60L 15/38 |
| | | | | 310/12.19 |
| 9,156,632 B2* | 10/2015 | Maeda | .................... | B65G 54/02 |
| 9,300,181 B2* | 3/2016 | Maeda | .................... | H02K 5/128 |
| 9,499,357 B2* | 11/2016 | Aumann | ................ | B65G 54/02 |
| 9,604,795 B2* | 3/2017 | Aumann | ................ | B65G 54/02 |
| 10,118,774 B2* | 11/2018 | Tomoda | ................ | B65G 54/02 |
| 2015/0357895 A1* | 12/2015 | Preuss | .................. | H02K 41/025 |
| | | | | 310/12.01 |
| 2016/0355350 A1 | 12/2016 | Yamamoto | | |
| 2017/0008709 A1 | 1/2017 | Tomoda et al. | | |
| 2017/0117829 A1 | 4/2017 | Yamamoto | | |

FOREIGN PATENT DOCUMENTS

| | | |
|---|---|---|
| JP | S63311514 A | 12/1988 |
| JP | H7-086772 A | 3/1995 |
| JP | 2001-179568 A | 7/2001 |

* cited by examiner

*Primary Examiner* — Gene O Crawford
*Assistant Examiner* — Keith R Campbell
(74) *Attorney, Agent, or Firm* — Venable LLP

(57) ABSTRACT

A transport system includes a plurality of coils; and a carriage that has a magnet and is movable in a first direction along the plurality of coils in accordance with electromagnetic force to which the magnet is subjected from the plurality of coils, and the carriage has a movable mechanism that is provided so as to be able to interlock with the magnet and is driven by electromagnetic force to which the magnet is subjected in a second direction intersecting with the first direction from the plurality of coils.

14 Claims, 19 Drawing Sheets

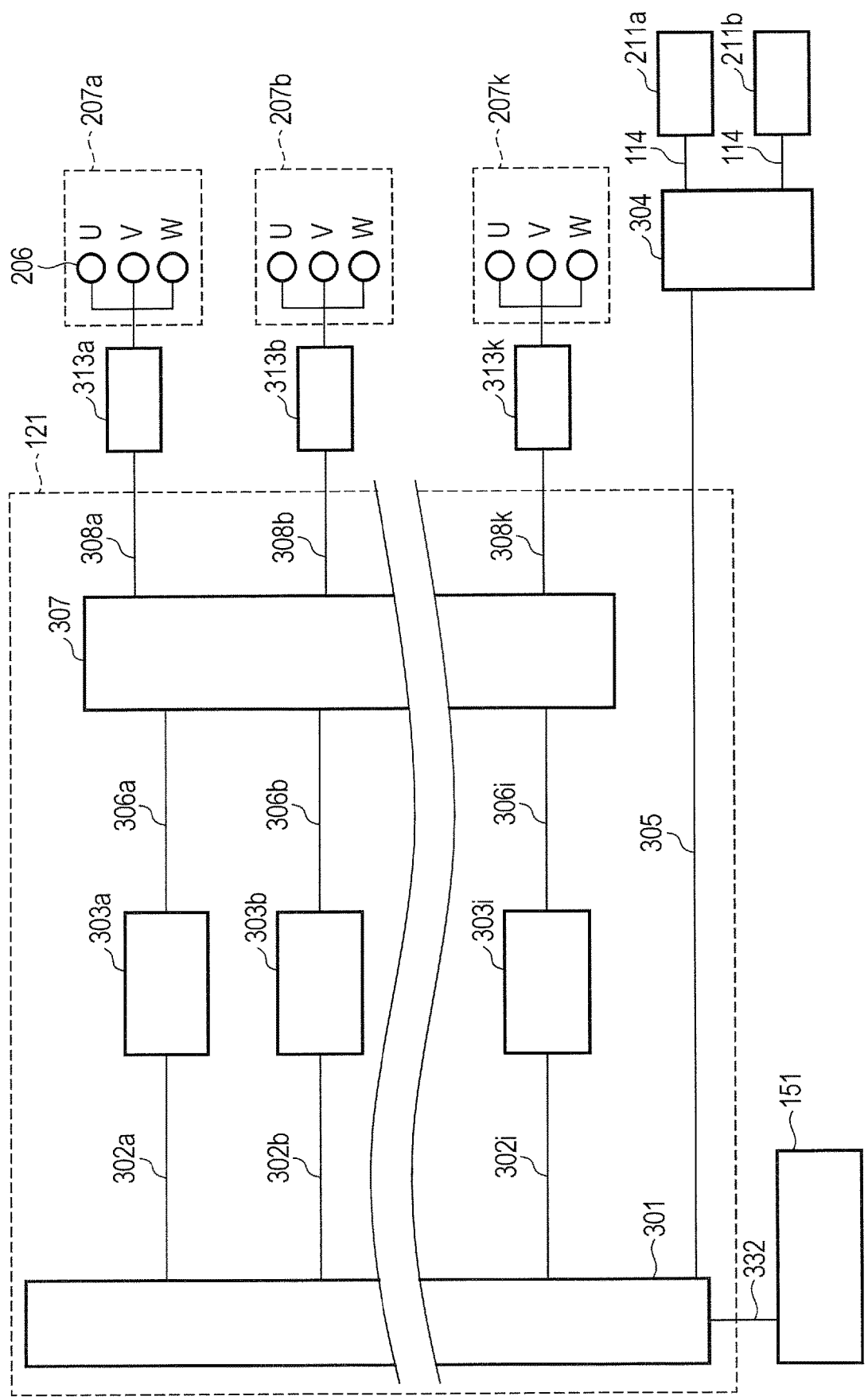

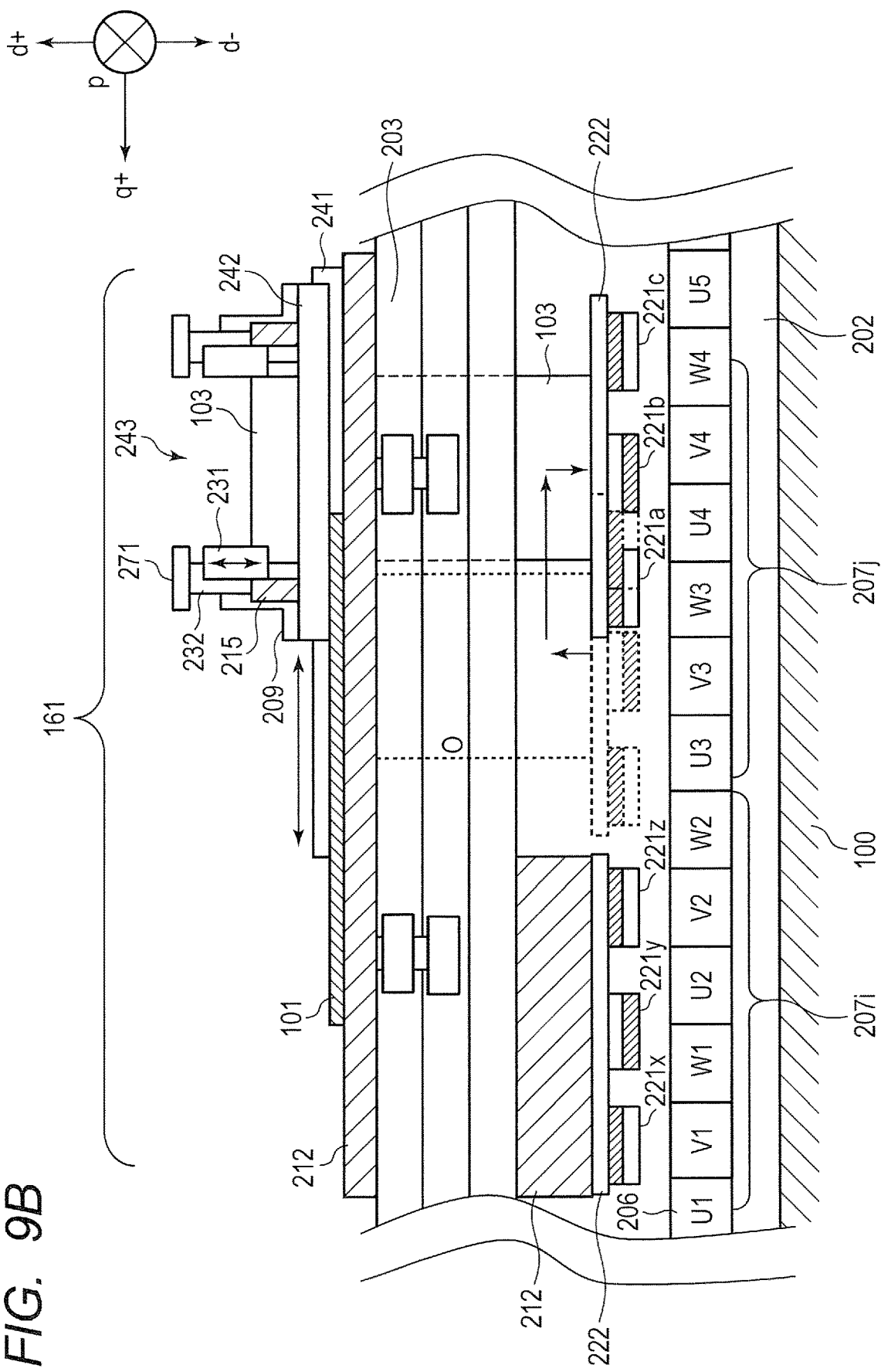

TRANSPORT SYSTEM, PROCESSING SYSTEM, AND CONTROL METHOD OF TRANSPORT SYSTEM

BACKGROUND OF THE INVENTION

Field of the Invention

The present invention relates to a transport system and a control method thereof using a movable magnet-type linear motor (a moving magnet-type linear motor, a movable magnetic field-type linear motor) and to a processing system having the transport system.

Description of the Related Art

In general, transport systems are used in production lines for assembling industrial products. A transport system in a production line transports a work such as a component among a plurality of stations within or between factory-automated production lines. As a transport system, a transport system with a movable magnet-type linear motor has already been proposed.

In a production line, a clamp/unclamp state of a work may be changed or a processing face of a work may be changed during each working process or between the previous working process and the next working process. In such a case, the state of a work on a mover in a transport system is changed to enter the next transport or working process. Thus, there is a problem that a wide installation space is required in the production line to arrange both a transport system and an apparatus used for changing the state of a work. Further, the time for converting the state of a work is required during transport or immediately before processing of a work, and this results in a problem of an increase in the entire time required to process the work. Thus, Japanese Patent Application Laid-Open No. 2001-179568 discloses a work transport apparatus that is provided with an attitude change mechanism that moves a work stage supporting a work along a guide member to change the attitude of the work. Japanese Patent Publication No. H7-86772 discloses a transport apparatus that moves a plurality of movers while gripping components among a plurality of movers.

In the work transport apparatus disclosed in Japanese Patent Application Laid-Open No. 2001-179568, however, there is a problem that attitude change mechanisms need to be installed adjacent to the work transport apparatuses for respective processes and therefore a large installation space needs to be secured. Further, when a processing position of a processing face in each process is changed, it is necessary to again adjust the installed attitude change mechanism every time, and it takes time for such adjustment.

When the position control of movers disclosed in Japanese Patent Publication No. H7-86772 is performed, it is possible to transport a carriage while maintaining a constant distance between two movers. However, position control of a plurality of movers needs to be performed along with a mover of a low moving speed, which results in a limited moving speed of a carriage.

Further, in the transport apparatus disclosed in Japanese Patent Publication No. H7-86772, it is necessary to detect the positions in real time in synchronization with a control cycle and control the drive timings for a plurality of movers. Therefore, in a transport apparatus using a movable magnet-type linear motor, a system needs to be configured to manage and control position information of all the carriages on the transport path at a significantly short cycle. Thus, there is a problem of increased complexity and size of a system.

SUMMARY OF THE INVENTION

The present invention intends to provide a transport system and a control method thereof that can drive a movable mechanism on a carriage without involving an increase in size or complexity of the system configuration and provide a processing system having the transport system.

According to one aspect of the present invention, provided is a transport system including: a plurality of coils; and a carriage that has a magnet and is movable in a first direction along the plurality of coils in accordance with electromagnetic force to which the magnet is subjected from the plurality of coils, and the carriage has a movable mechanism that is provided so as to be able to interlock with the magnet and is driven by electromagnetic force to which the magnet is subjected in a second direction intersecting with the first direction from the plurality of coils.

According to another aspect of the present invention, provided is a transport system including: a plurality of coils; and a carriage that has a first magnet and a second magnet and is movable in a first direction along the plurality of coils by electromagnetic force to which the first magnet is subjected from the plurality of coils, and the carriage has a movable mechanism that is provided so as to be able to interlock with the second magnet and is driven by electromagnetic force to which the second magnet is subjected in the first direction from the plurality of coils and electromagnetic force to which the second magnet is subjected in a second direction intersecting with the first direction from the plurality of coils.

According to yet another aspect of the present invention, provided is a processing system including: the transport system described above; and a process apparatus that performs a processing operation on a work transported by the carriage.

According to still another aspect of the present invention, provided is a control method of a transport system, and the control method includes: moving a carriage having a magnet in a first direction along a plurality of coils by electromagnetic force to which the magnet is subjected from the plurality of coils; and driving a movable mechanism by electromagnetic force to which the magnet is subjected in a second direction intersecting with the first direction from the plurality of coils, the movable mechanism being provided to the carriage and provided so as to be able to interlock with the magnet.

According to still another aspect of the present invention, provided is a control method of a transport system, and the control method includes: moving a carriage having a first magnet and a second magnet in a first direction along a plurality of coils by electromagnetic force to which the first magnet is subjected from the plurality of coils; and driving a movable mechanism by electromagnetic force to which the second magnet is subjected in the first direction from the plurality of coils and electromagnetic force to which the second magnet is subjected in a second direction intersecting with the first direction from the plurality of coils, the movable mechanism being provided to the carriage and provided so as to be able to interlock with the second magnet.

According to the present invention, a movable mechanism on a carriage can be driven without an increase in size or complexity of a system configuration.

Further features of the present invention will become apparent from the following description of exemplary embodiments with reference to the attached drawings.

BRIEF DESCRIPTION OF THE DRAWINGS

FIG. 4 is a block diagram illustrating a system configuration for controlling a carriage according to the first embodiment of the present invention.

FIG. 9B is a schematic diagram illustrating the carriage and the transport path according to the third embodiment of the present invention.

DESCRIPTION OF THE EMBODIMENTS

Preferred embodiments of the present invention will now be described in detail in accordance with the accompanying drawings.

First Embodiment

Figure 1:
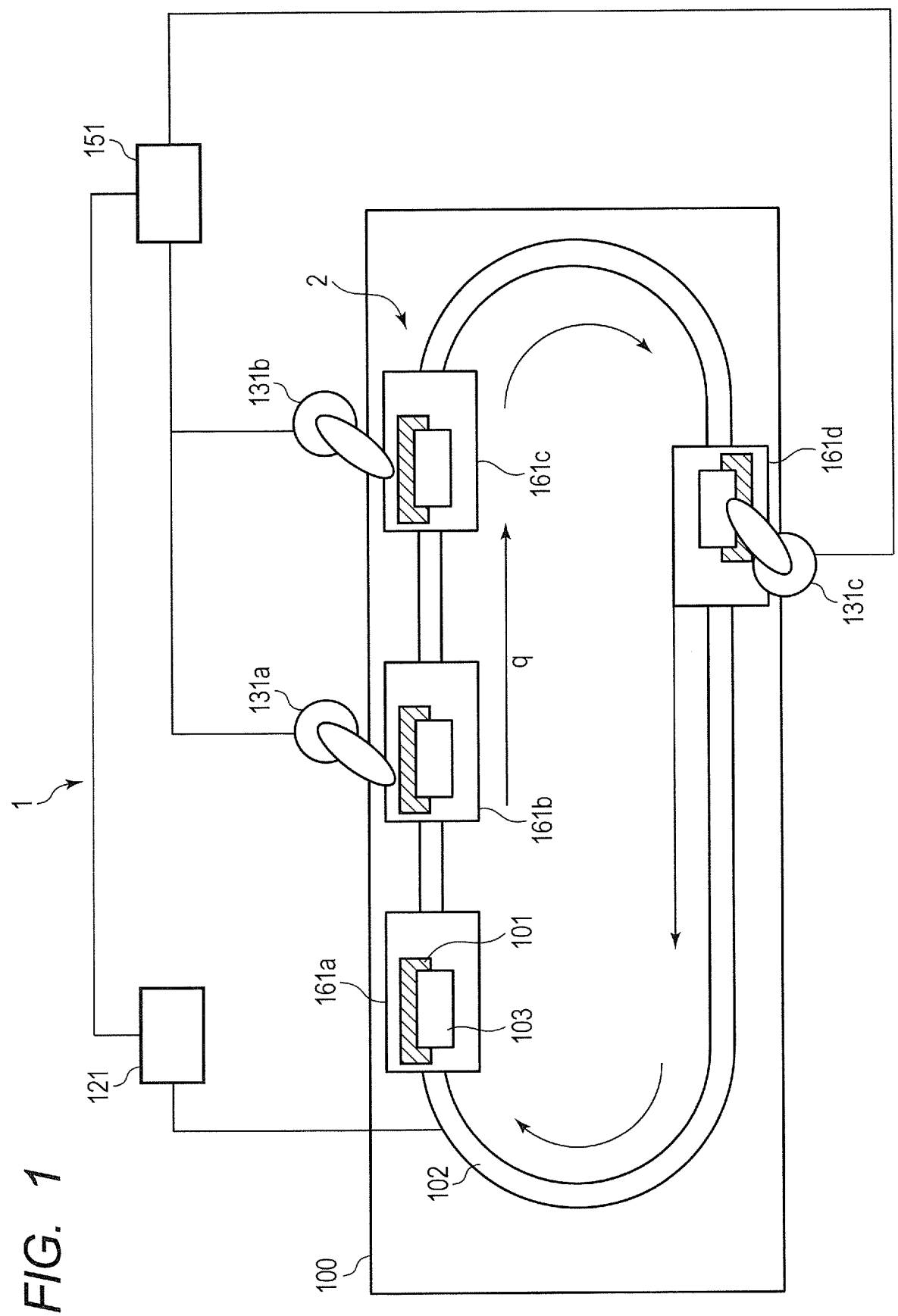
FIG. 1 is a schematic diagram illustrating the entire configuration of a processing system according to a first embodiment of the present invention.

A first embodiment of the present invention will be described below with reference to the drawings. First, the entire configuration of a processing system according to the present embodiment will be described by using FIG. 1. FIG. 1 is a schematic diagram illustrating the entire configuration of the processing system according to the present embodiment.

As illustrated in FIG. 1, a processing system 1 according to the present embodiment has a transport path 102, carriages 161, process apparatuses 131, a transport controller 121, and a process controller 151. The processing system 1 according to the present embodiment includes a transport system 2 that transports works 101 to be processed. The transport system 2 has the transport path 102, the carriages 161, and the transport controller 121. FIG. 1 illustrates four carriages 161a, 161b, 161c, and 161d as the carriages 161. Further, three process apparatuses 131a, 131b, and 131c are illustrated as the process apparatuses 131 that apply processing operations to the work 101. In the description, the carriages 161a, 161b, 161c, and 161d are simply denoted as "carriage 161" unless required to be distinguished in particular. Further, the process apparatuses 131a, 131b, and 131c are simply denoted as "process apparatus 131" unless required to be distinguished in particular.

The transport system 2 having the transport path 102 and the carriage 161 is a transport system with a movable magnet-type linear motor. The transport path 102 is placed on a frame 100. The transport path 102 is an elliptical circulation path, for example. The carriage 161 moves along the transport path 102. Note that, while the four carriages 161a, 161b, 161c, and 161d are illustrated in FIG. 1, the number of the carriages 161 is not limited to four and may be one or plural. Further, the transport path 102 is not limited to the elliptical circulation path, and any form of path may be employed.

The carriage 161 has a work holder 103 that holds the work 101. The carriage 161 holds the work 101 using the work holder 103 and transports the work 101. The transport controller 121 is communicably connected to the transport path 102 and controls transport of the carriage 161. The shape, the material, or the like of the work 101 held by the work holder 103 is not limited in particular, and the work 101 may be a sheet-like or plate-like work, for example.

The process apparatus 131 applies a processing operation to the works 101 sequentially transported by the carriages 161. The process apparatus 131 performs various process operations. The process apparatus 131 performs application of an adhesive, attachment or detachment of a component, irradiation of a light beam, or the like, for example, on the work 101.

The process controller 151 is communicably connected to the process apparatus 131 and the transport controller 121, respectively. The process controller 151 causes the process apparatuses 131 to sequentially perform operations on the work 101 by moving the process apparatuses 131 while moving the carriages 161.

Figure 2:
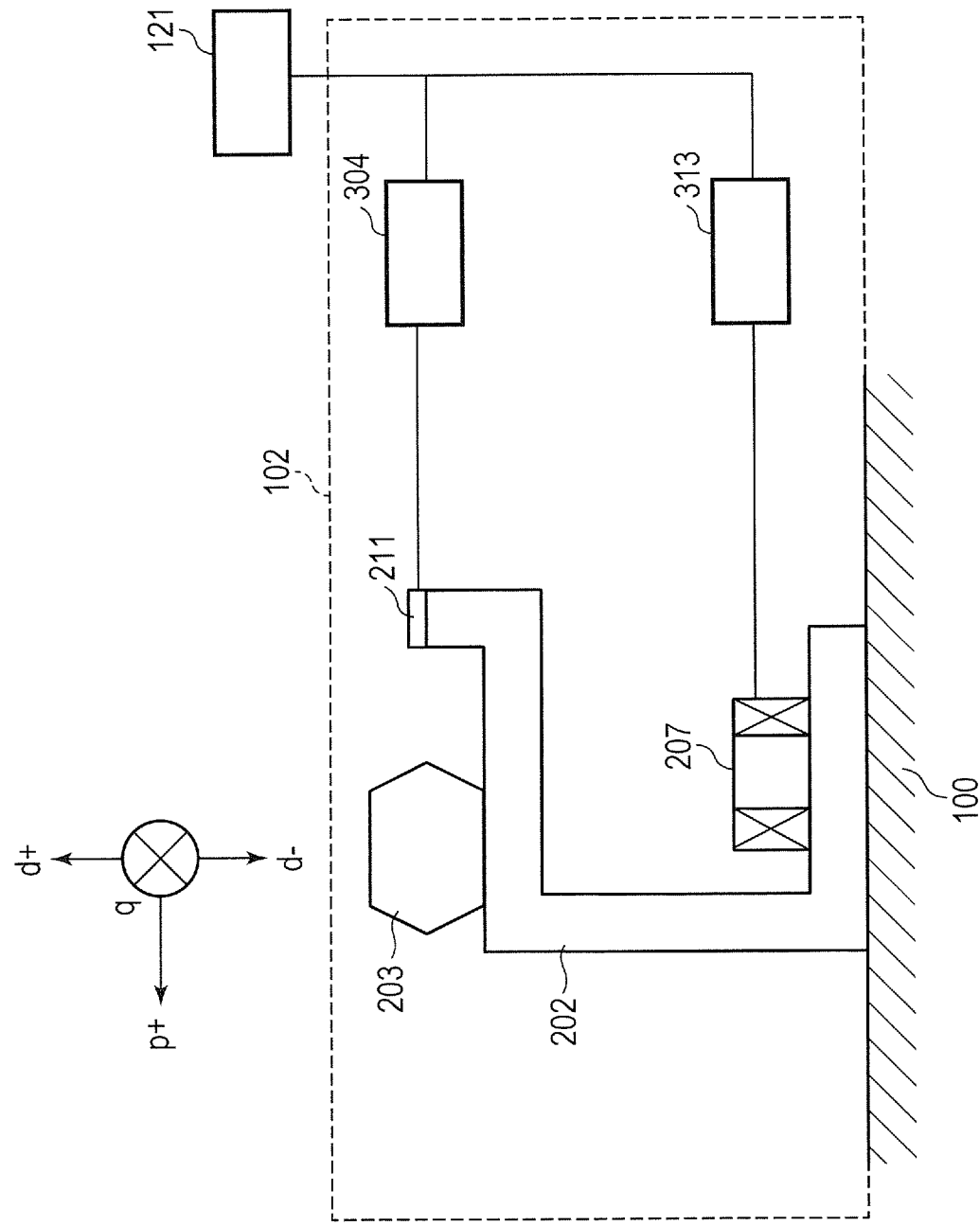
FIG. 2 is a schematic diagram illustrating a configuration of a transport path according to the first embodiment of the present invention.

Next, the configuration of the transport path 102 will be described by using FIG. 2. FIG. 2 is a schematic diagram illustrating the configuration of the transport path 102. As illustrated in FIG. 2, the transport path 102 has a casing 202, a guiderail 203, a coil unit 207, an encoder 211, a carriage position calculation unit 304, a current controller 313, and a current detector 314 (see FIG. 3).

The casing 202 is fixed on the frame 100. The encoder 211 and the coil unit 207 are fixed in the casing 202. Further, the guiderail 203 is fixed on the casing 202. As described later, the carriage 161 is arranged on the guiderail 203 so as to be movable along the guiderail 203.

The encoder 211 reads the value of a scale 210 described later (see FIG. 5A) of the carriage 161 and outputs information on the relative positional relationship between the scale 210 and the encoder 211. The encoder 211 is communicably connected to the transport controller 121 via the carriage position calculation unit 304.

Figure 3:
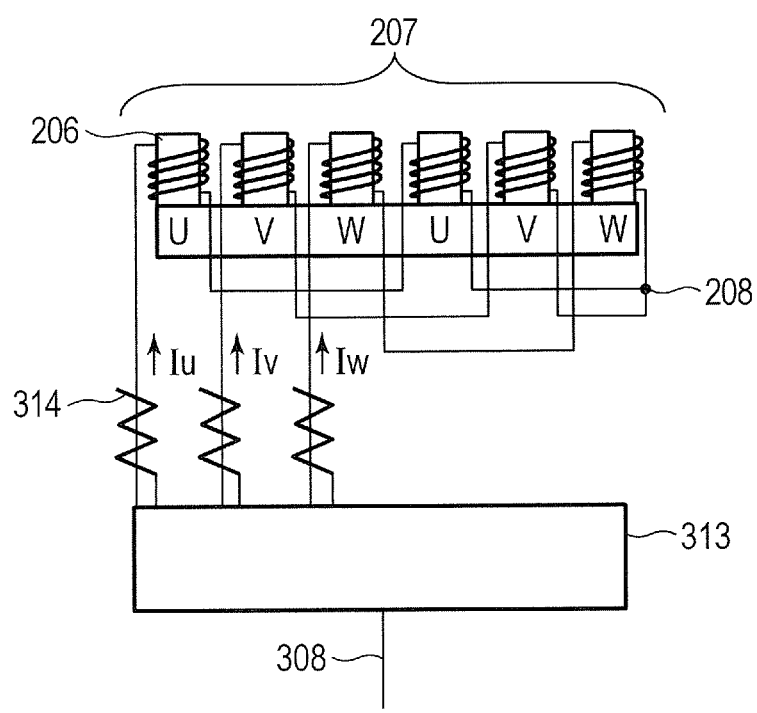
FIG. 3 is a schematic diagram illustrating a connection form of a coil unit, current detectors, and a current controller in the transport path according to the first embodiment of the present invention.

The coil unit 207 is a group of coils 206 (see FIG. 3). A plurality of coil units 207 are arranged along the transport path 102. The carriage 161 is configured to be movable along the plurality of coils 206 of the coil unit 207. The coil unit 207 is communicably connected to the transport controller 121 via the current controller 313.

Coordinate axes and directions used in the following description are now defined. First, a q-axis is defined as an axis along the transport direction of the carriage 161. Further, a d-axis is defined as an axis along a direction in which the coil unit 207 face the permanent magnets 211 (see FIG. 5A and FIG. 5B) of the carriage 161 and which is a direction intersecting with the moving direction of the carriage 161, preferably, the perpendicular direction. Further, a p-axis is defined as an axis along a direction intersecting with both the q-axis and the d-axis. Preferably, the p-axis is defined as an axis along a direction orthogonal to both the q-axis and the d-axis. In the coordinate system whose coordinate axes are defined in such a way, of the q-axis direction that is a direction in the q-axis, the same direction as the transport direction of the carriage 161 is defined as a (q+)-direction, and the opposite direction to the (q+)-direction is defined as a (q−)-direction. Further, of the d-axis direction that is a direction in the d-axis, the direction from the transport path 102 side to the carriage 161 side, preferably, the perpendicularly upward direction is defined as a (d+)-direction, and the direction from the carriage 161 side to the transport path 102 side, preferably, the perpendicularly downward direction is defined as a (d−)-direction. Preferably, the d-axis direction is a direction orthogonal to the q-axis direction that is the moving direction of the carriage 161. Further, of the p-axis direction that is a direction in the p-axis, the direction from the right side to the left side with respect to the (q+)-direction is defined as a (p+)-direction, and the opposite direction to the (p+)-direction is defined as a (p−)-direction.

Next, the coil unit 207, the current detectors 314, and the current controller 313 in the transport path 102 will be described by using FIG. 3. FIG. 3 is a schematic diagram illustrating the coil unit 207, the current detectors 314, and the current controller 313 in the transport path 102.

The coil unit 207 has a plurality of coils 206 installed to be aligned in the transport direction of the carriage 161. The coil 206 includes a core and a winding wound around the core. The core is a magnetic material such as a metal having a large magnetic permeability. In the coil unit 207, a plurality of coils 206 are arranged to enable three-phase driving for the U-phase, the V-phase, and the W-phase. FIG. 3 illustrates a case as an example where the coil unit 207 is formed of a set of six coils 206 and each two coils 206 for each phase are connected in series. The coils 206 in the U-phase connected in series, the coils 206 in the V-phase connected in series, and the coils 206 in the W-phase connected in series are connected to each other at an end 208 of the coil unit 207.

The current detectors 314 are provided between the current controller 313 and the coil unit 207. The current detector 314 detects a current flowing between the current controller 313 and the coil unit 207. The current detector 314 detects a current, where a current amount flowing in the direction from the current controller 313 to the coil unit 207 is defined as positive. The current detector 314 inputs information on the detected current to the current controller 313. Here, currents flowing in the U-phase, the V-phase, and the W-phase are denoted as Iu, Iv, and Iw, respectively. In the case illustrated in FIG. 3, since the coils 206 in the U-phase connected in series, the coils 206 in the V-phase connected in series, and the coils 206 in the W-phase connected in series are connected to each other at the end 208 of the coil unit 207, the relationship of the following equation (1) is established among the currents Iu, Iv, and Iw.

$$Iu+Iv+Iw=0 \qquad (1)$$

The current controller 313 controls and supplies a current flowing in each coil 206 of the coil unit 207 based on current instruction values 308 transmitted from a coil unit control unit 307 and information on the current input from the current detectors 314 as described later.

Next, the configuration for controlling the carriage 161 according to the present embodiment will be described by using FIG. 4. FIG. 4 is a block diagram illustrating a system configuration for controlling the carriage 161 according to the present embodiment and illustrates a control method of the transport system 2 according to the present embodiment. FIG. 4 illustrates coil units 207a, 207b, . . . , and 207k as a plurality of coil units 207 and illustrates corresponding current controllers 313a, 313b, . . . , and 313k as the current control units 313.

When the carriage 161 is controlled, the process controller 151, the transport controller 121, the carriage position calculation unit 304, the current controllers 313, and the like operate in cooperation. The transport controller 121 has a carriage group controller 301, a plurality of carriage controllers 303, and a coil unit controller unit 307. In FIG. 4, carriage controllers 303a, 303b, . . . , and 303i are illustrated as the plurality of carriage controllers 303.

The process controller 151 is communicably connected to the transport controller 121. The process controller 151 transmits, to the transport controller 121, carriage group control information 332 necessary for transporting the carriage 161. The carriage group control information 332 transmitted to the transport controller 121 is input to the carriage group controller 301 of the transport controller 121.

The carriage position calculation unit 304 is communicably connected to the plurality of encoders 211 installed along the transport path 102. In FIG. 4, encodes 211a and 211b are illustrated as the plurality of encoders 211. The carriage position calculation unit 304 calculates respective positions on the transport path 102 of the plurality of carriages 161 based on information 114 output from the plurality of encoders 211.

Further, the carriage position calculation unit 304 is communicably connected to the transport controller 121. The carriage position calculation unit 304 transmits the carriage position information 305 on each of the calculated positions of the carriages 161 to the transport controller 121. The carriage position information 305 transmitted to the transport controller 121 is input to the carriage group controller 301 of the transport controller 121.

The carriage group controller 301 controls the entire transport of the plurality of carriages 161. The carriage group controller 301 is communicably connected to the plurality of carriage controllers 303. Each of the carriage controllers 303 controls the corresponding carriage 161.

The carriage group controller 301 generates carriage control information 302 used for controlling the carriages 161 on a carriage 161 basis based on the carriage group control information 332 and the carriage position information 305. The carriage group controller 301 transmits the generated carriage control information 302 on each of the carriages 161 to the corresponding carriage controller 303. FIG. 4 illustrates a case where the carriage group controller 301 transmits carriage control information 302a, 302b, and 302i as the carriage control information 302 to the carriage controllers 303a, 303b, . . . , and 303i, respectively. The carriage control information 302 includes information on the current position of the carriage 161 and position information of the carriage 161 including information on a carriage destination position that is a position where the carriage 161 is to be transported.

The plurality of carriage controllers 303 are communicably connected to the coil unit control unit 307. The carriage controller 303 calculates the associated coil unit 207 based on the position information on the carriage 161 included in the carriage control information 302. Further, the carriage controller 303 determines a current instruction value for each of the coil units 207 and transmits current control information 306 including the determined current instruction value to the coil unit control unit 307. FIG. 4 illustrates a case where the carriage controllers 303a, 303b, . . . , and 303i transmit current control information 306a, 306b, . . . , and 306i as the current control information 306, respectively.

The coil unit control unit 307 is communicably connected to the current controllers 313 provided for respective coil units 207. The coil unit control unit 307 transmits the desired current instruction values 308 to the current controllers 313 provided for respective coil units 207 based on the current control information 306 transmitted from the plurality of carriage controllers 303. FIG. 4 illustrates a case where the coil unit control unit 307 transmits current instruction values 308a, 308b, . . . , and 308k as the current control values 308 to the current controllers 313a, 313b, . . . , and 313k, respectively.

The current controllers 313 control current values and apply the currents to the corresponding coil units 207 based on the current instruction values 308. Current values are controlled by the current controllers 313 and currents are applied to the coil units 207, and thereby electromagnetic force occurs between the permanent magnets 221 provided to the carriage 161 and the coil unit 207. With the electromagnetic force being generated in such a way, the carriage 161 obtains thrust and is transported.

Figure 5A:
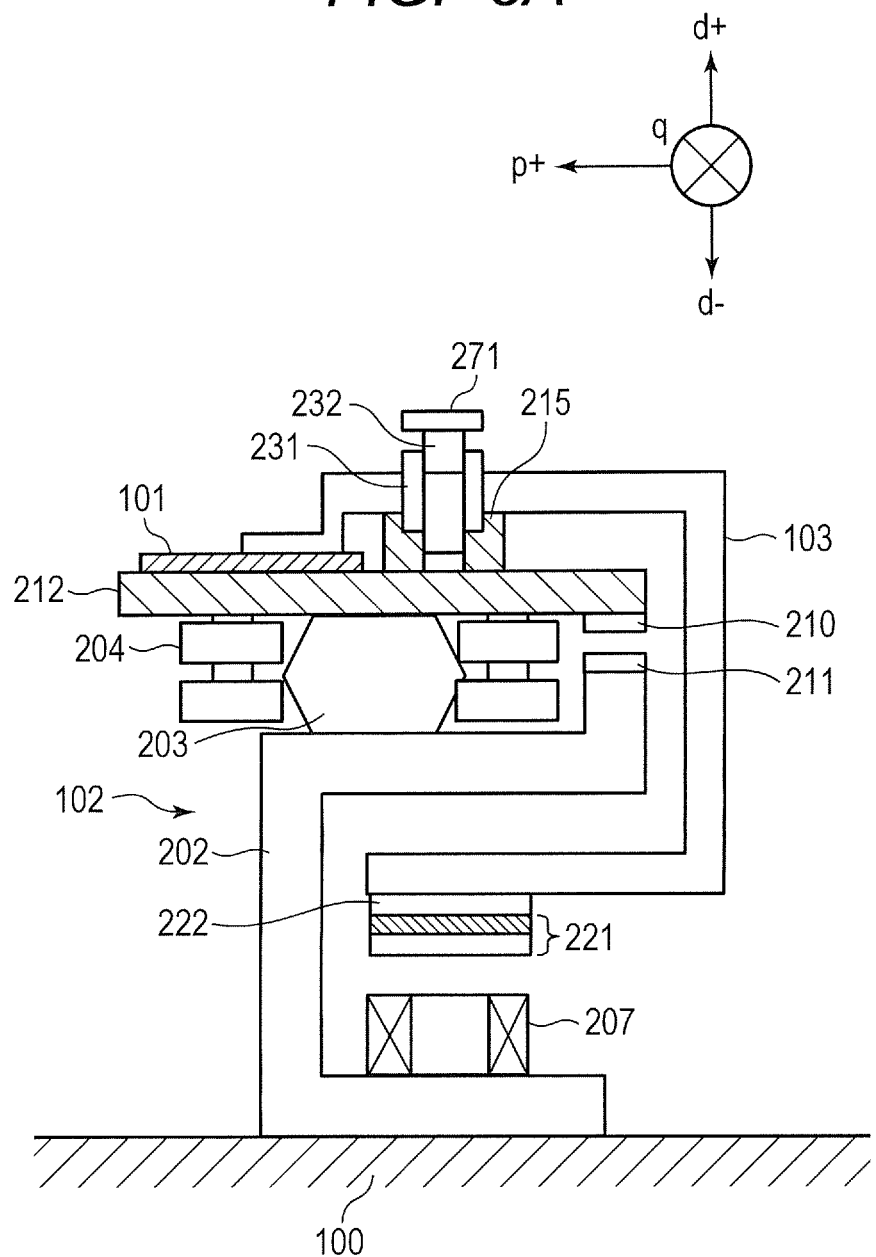
FIG. 5A is a schematic diagram illustrating the carriage and the transport path according to the first embodiment of the present invention.
Figure 5B:
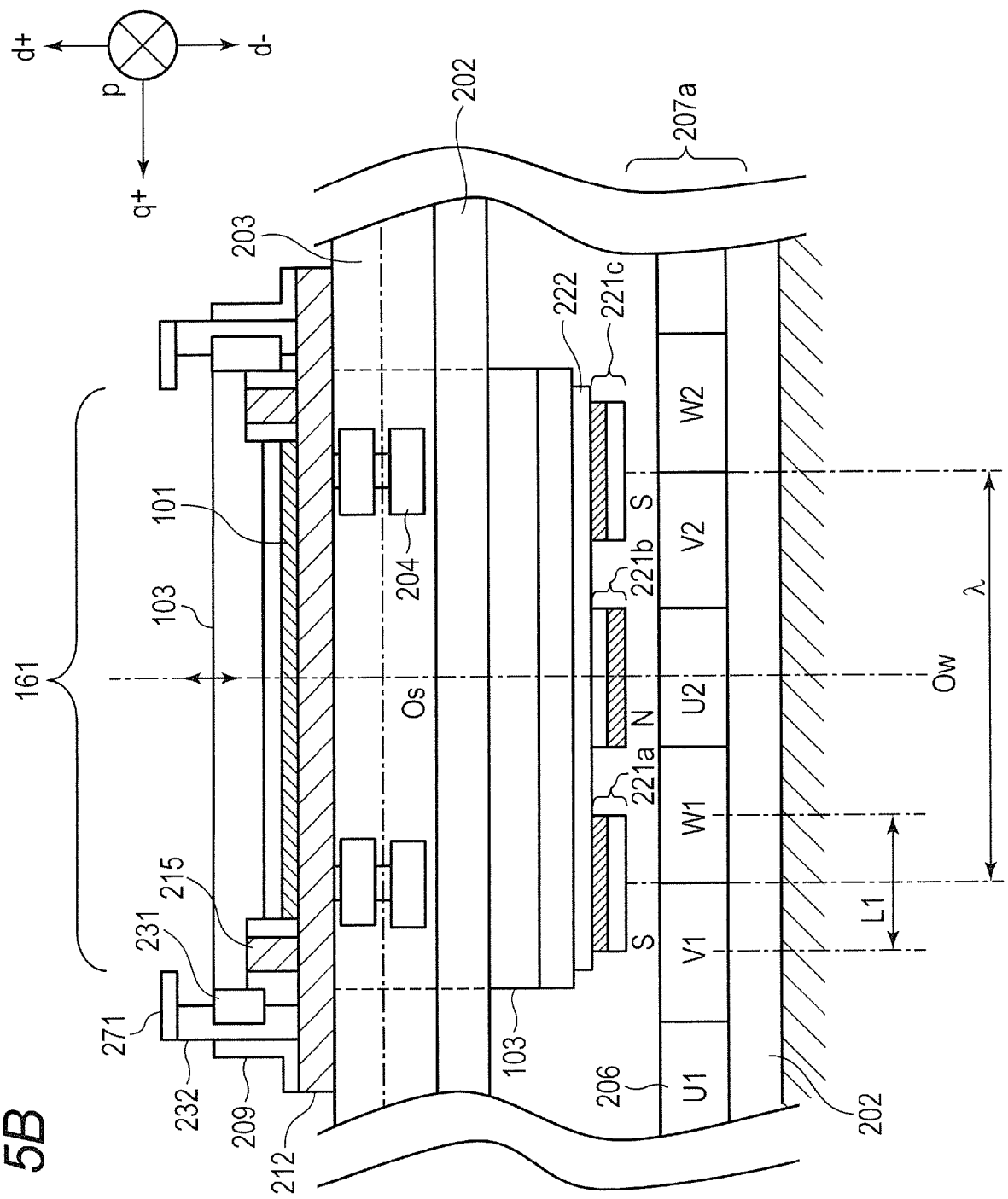
FIG. 5B is a schematic diagram illustrating the carriage and the transport path according to the first embodiment of the present invention.

Next, details of the configuration of the carriage 161 and the transport path 102 will be described by using FIG. 5A and FIG. 5B. FIG. 5A and FIG. 5B illustrate a schematic diagram illustrating the carriage 161 and the transport path 102 according to the present embodiment, respectively. FIG. 5A is a diagram viewed from the q-axis direction, and FIG. 5B is a diagram viewed from the p-axis direction. Note that, in FIG. 5B, a part of the casing 202 or the like that is unnecessary for the description is omitted.

As illustrated in FIG. 5A and FIG. 5B, the carriage 161 has journals 204, the scale 210, a carriage top plate 212, the work holder 103, the permanent magnet 221, and a magnet catch 271.

The journals 204 are fixed to the under face of the carriage top plate 212. Each of the journals 204 is configured to be able to rotate and travel along the guiderail 203. The carriage top plate 212 to which the journals 204 are fixed is able to move along the guiderail 203 by using the journals 204.

The scale 210 is fixed to the carriage top plate 212 that can be read by the encoders 211 of the transport path 102. The encoder 211 reads the scale 210 to detect the relative position of the scale 210 to the encoder 211.

A linear guide 232 is fixed to a bracket 209 on the top face of the carriage top plate 212 that is a top plate on which the work 101 is supplied. A guide block 231 is guided along the linear guide 232 so as to be able to move in the d-axis direction along the linear guide 232. The work holder 103 is fixed to the guide block 231. The work holder 103 and the permanent magnets 221 fixed thereto are able to move in the d-axis direction together with the guide block 231.

The plurality of permanent magnets 221 are fixed to the work holder 103 via a yoke 222. The work holder 103 is able to interlock with the plurality of fixed permanent magnets 221. FIG. 5B illustrates a case where three permanent magnets 221a, 221b, and 221c as the permanent magnets 221 are fixed to the work holder 103. The plurality of permanent magnets 221 are arranged to have alternating polarities. In the case illustrated in FIG. 5B, the permanent magnets 221a and 221c are fixed such that the polarity thereof on the coil 206 side is the S-pole. On the other hand, the permanent magnet 221b is fixed such that the polarity thereof on the coil 206 side is the N-pole. The yoke 222 is a metal that primarily includes a substance having a large magnetic permeability. The permanent magnets 221 are fixed under the work holder 103 to be able to face the plurality of coils 206 of the coil unit 207 in the transport path 102. Attractive force, which attracts each other, is generated between the permanent magnets 221 and the coil unit 207.

Note that, while the case where the permanent magnets 221 are fixed to the work holder 103 that is a movable mechanism is described in the present embodiment, the embodiment is not limited thereto. The work holder 103 may be provided to be able to interlock the permanent magnets 221.

An elastic member 215 is provided between the work holder 103 and the carriage top plate 212. The elastic member 215 may be, for example, a spring, a rubber, or the like. The elastic member 215 generates force in the d-axis direction between the carriage top plate 212 and the work holder 103. Specifically, the elastic member 215 generates force in the (d+)-direction when the work holder 103 grips and presses the work 101 between the work holder 103 and the carriage top plate 212 as described below.

The work holder 103 is a movable mechanism driven by the plurality of coils 206 of the coil unit 207 as described later and is to hold the work 101 on the carriage 161. The work holder 103 grips and presses the work 101 between the work holder 103 and the carriage top plate 212. Thereby, the position of the work 101 is held against and fixed to the carriage top plate 212 on the carriage top plate 212. The work holder 103 is configured to be switched between a state of gripping and holding the work 101 between the work holder 103 and the carriage top plate 212 and a state of not gripping and releasing the work 101 from the carriage top plate 212. That is, in accordance with the state of the work holder 103, the work 101 on the carriage 161 is switched between a clamp state, which is a state of being held and fixed by the work holder 103, and an unclamp state, which is a state of not being held by and being released from the work holder 103. The permanent magnets 221 fixed to the work holder 103 are attracted to the cores of the coils 206 by the magnetic force with respect to the cores of the coils 206 in the transport path 102. Thus, the work holder 103 is always subjected to force in the (d−)-direction. The force in the (d−)-direction applied to the work holder 103 is divided into force that deforms the elastic member 215 and force with which the work holder 103 pushes the work 101 in the (d−)-direction.

The magnet catch 271 is provided in the upper part of the work holder 103. The work holder 103 is formed of a material that can be absorbed by the magnetic force of the magnet catch 271. The magnet catch 271 absorbs the work holder 103 using absorption force due to magnetic force in a certain case as described later and holds the work holder 103 at a constant position. Note that the work holder 103 may have at least a portion formed of a material that can be absorbed by magnetic force so that the magnet catch 271 can be absorbed.

The transport system 2 according to the present embodiment is configured to be able to apply force in the q-axis direction and the d-axis direction to the work holder 103 and the permanent magnets 221 by using the plurality of coils 206 of the coil unit 207. A method of applying force in the q-axis direction and the d-axis direction to the work holder 103 and the permanent magnets 221 will be described. The force in the q-axis direction and the d-axis direction applied by the plurality of coils 206 of the coil unit 207 is electromagnetic force generated by interaction of currents flowing in the coils 206 and magnetic fields generated by the permanent magnets 221.

Symbols used in the following description are now defined. A value Iu denotes a U-phase current flowing in the coil unit 207. A value Iv denotes a V-phase current flowing in the coil unit 207. A value Iw denotes a W-phase current flowing in the coil unit 207. A value Q denotes a position on the q-axis of the carriage 161. A vector (A, B) denotes a vector having elements A and B, and a vector (a, b, c) denotes a vector having elements a, b, and c. A vector (Iu, Iv, Iw) denotes a current vector having elements Iu, Iv, and Iw. Note that "·" denotes a multiplication symbol.

As illustrated in FIG. 5B, the center in the q-axis direction of the carriage 161 is defined as the origin Os in the coil unit 207(207a). The center of the permanent magnet 221b is located at the origin Os. On the other hand, the center in the q-axis direction of the permanent magnet 221a is located at a distance of +λ/2 from the origin Os in the q-axis direction. The center in the q-axis direction of the permanent magnet 221c is located at a distance of −λ/2 from the origin Os in the q-axis direction. Therefore, the distance in the q-axis direction between the centers of the permanent magnet 221a and the permanent magnet 221c is λ.

In FIG. 5B, a single coil unit 207a is illustrated as the coil unit 207. In the single coil unit 207, the coils 206 of respective phases of the U-phase, the V-phase, and the W-phase are aligned in this order in a direction from the (q+)-side to the (q−)-side that is the transport direction, that is, the (q−)-direction. In the case illustrated in FIG. 5B, the U-phase coils 206 are denoted as U1 and U2, the V-phase coils 206 are denoted as V1 and V2, and the W=phase coils 206 are denoted as W1 and W2, and the coils U1, V1, W1, U2, V2, and W2 are aligned in this order in the (q−)-direction. Each of the coils 206 are configured such that the polarity on the permanent magnets 221 side is the N-pole when a current in the positive direction is applied to the coil 206.

The origin of the transport path 102 is denoted as Ow, and the origin Ow is located at the center of the coil U2. FIG. 5B schematically illustrates a state where the origin Ow of the transport path 102 matches the origin Os of the carriage 161.

Symbols used in the following description will be now further defined. A value Iq denotes a q-axis current that is a current contributing to generation of force to which the work holder 103 is subjected in the q-axis direction. A value Id denotes a d-axis current that is a current contributing to generation of force to which the work holder 103 is subjected in the d-axis direction. A value Fq denotes a magnitude of force to which the work holder 103 and the permanent magnets 221 are subjected in the q-axis direction. A value Fd denotes a magnitude of force to which the work holder 103 and the permanent magnets 221 are subjected in the d-axis direction. A value Cq denotes a magnitude of force in the q-axis direction generated per unit q-axis current. A value Cd denotes a magnitude of force in the d-axis direction generated per unit d-axis current. The value Cq is a thrust constant in the q-axis direction, and the value Cd is a thrust constant in the d-axis direction. Furthermore, the q-axis phase is defined θ by the following equation (2).

$$\theta = 2\pi \cdot Q/\lambda \quad (2)$$

Accordingly, Iq and Id are expressed by the following equations (3) and (4), respectively.

$$Iq = Iu \cdot \sin(\theta) + Iv \cdot \sin(\theta+120°) + Iw \cdot \sin(\theta+240°) \quad (3)$$

$$Id = Iu \cdot \cos(\theta) + Iv \cdot \cos(\theta+120°) + Iw \cdot \cos(\theta+240°) \quad (4)$$

Further, Fq and Fd are expressed by the following equations (5) and (6), respectively. Each of Fq and Fd is electromagnetic force to which the permanent magnets 221 is subjected from the coils 206 of the coil unit 207.

$$Cq \cdot Iq = Fq \quad (5)$$

$$Cd \cdot Id = Fd \quad (6)$$

For example, as illustrated in FIG. 5B, when Ow matches Os, Q and θ are zero as indicated in the following equation (7), respectively.

$$Q = \theta = 0 \quad (7)$$

In the example where Ow and Os are matched, the equations (3) and (4) can be modified as the following equations (3-1) and (4-1), respectively, in this case.

$$Iq = Iu \cdot 0 + 1v \cdot \sqrt{3}/2 + Iw \cdot (-\sqrt{3}/2) \quad (3\text{-}1)$$

$$Id = Iu \cdot 1 + 1v \cdot (-1/2) + Iw \cdot (-1/2) \quad (4\text{-}1)$$

In the above-described example, a case is considered where a current vector expressed by the following equation (8) as the current vector (Iu, Iv, Iw) is applied to the coil unit 207.

$$(Iu, Iv, Iw) = (1.0[A], -0.5[A], -0.5[A]) \quad (8)$$

In this case, Iq and Id are calculated as the following equations (3-2) and (4-2), respectively.

$$Iq = 0 - 0.5 \cdot \sqrt{3}/2 - 0.5 \cdot (-\sqrt{3}/2) = 0[A]) \quad (3\text{-}2)$$

$$Id = 1.1 - 0.5 \cdot (-1/2) - 0.5 \cdot (-1/2) = 3/2[A]) \quad (4\text{-}2)$$

Here, when Cq is 20√3[N/A] and Cd is 20[N/A], (Fq, Fd) will be indicated by the following equation (9).

$$(Fq, Fd) = (0[N], 30[N]) \quad (9)$$

Accordingly, only force of 30 N in the (d+)-direction can be applied to the work holder 103. It is thus possible to change the state of the work holder 103 by applying the force in the d-axis direction to the work holder 103. Specifically, by applying force in the (d+)-direction to the work holder 103, it is possible to change the state of the work holder 103 from a state of holding and fixing the work 101 to a state of not holding and thus releasing the work 101. This allows the work 101 to change from a clamp state to an unclamp state.

When the condition expressed by the following equation (10) is satisfied, the work holder 103 moves in the (d+)-direction due to the force in the (d+)-direction. Note that a value Fb is the magnitude of force with which the elastic member 215 pushes the work holder 103 in the (d+)-direction. A value Fmc is the magnitude of force with which the permanent magnets 221 and the coil unit 207 are attracted each other.

$$Fd + Fb > Fmc \quad (10)$$

When the condition expressed by the equation (10) is satisfied, the work 101 held between the carriage top plate 212 and the work holder 103 enters a state of not subjected to force from the work holder 103 and being released. The condition expressed by the equation (10) can be satisfied by proper control of the current values of Iu, Iv, and Iw applied to the coil unit 207.

Accordingly, the work holder 103 is driven by the plurality of coils 206 of the coil unit 207 and switched between a state of gripping and holding the work 101 between the work holder 103 and the carriage top plate 212 and a state of not gripping and thus releasing the work 101 from the carriage top plate 212. That is, the work 101 on the carriage 161 can be switched between a state of being clamped between the carriage top plate 212 and the work holder 103 and an unclamp state of not being clamped.

Note that, while the current values of Iu, Iv, and Iw are set so that Fq becomes zero in the equation (6), that is, Iq becomes zero in the above description, the embodiment is not limited thereto. For example, the carriage 161 can be servo-driven so as to maintain a target position thereof in the q-axis direction. In this case, it is necessary to generate thrust in the q-axis direction to the carriage 161. When the carriage 161 is servo-driven in such a way, (Iq, Id) are obtained from desired (Fq, Fd) including Fq required for servo driving based on the equations (5) and (6). Furthermore, the obtained (Iq, Id) are used to solve the equations (3) and (4) for (Iu, Iv, Iw) using an inverse matrix operation. Accordingly, a desired current vector (Iu, Iv, Iw) is obtained.

Note that the target position of the above-described carriage 161 may be constant over time or may depend on a desired position profile that changes with time. As an example, a case is considered where the current vector expressed by the following equation (11) is applied to the coil unit 207.

$$(Iu, Iv, Iw) = (1.0[A], -1.0[A], 0[A]) \quad (11)$$

In this case, Iq, Id, and (Fq, Fd) are calculated by the following equations (3-3), (4-3), and (12), respectively. Note that Cq is $20\sqrt{3}$[N/A] and Cd is 20[N/A].

$$Iq = 0 - 1.0 \cdot \sqrt{3}/2 + 0 \cdot (-\sqrt{3}/2) = -\sqrt{3}/2[A]) \quad (3\text{-}3)$$

$$Id = 1 \cdot 1 - 1 \cdot (-1/2) + 0 \cdot (-1/2) = 3/2[A] \quad (4\text{-}3)$$

$$(Fq, Fd) = (-20\sqrt{3} \cdot \sqrt{3}/2, 20 \cdot 3/2) = (-30[N], 30[N]) \quad (12)$$

As discussed above, in the present embodiment, force can be applied at the same time in the q-axis direction and the d-axis direction to the work holder 103 and the permanent magnets 221. The force in the q-axis direction is applied also to the carriage 161 via the work holder 103.

As set forth, it is possible to simultaneously control the force in the q-axis direction, which is the traveling direction of the carriage 161, and the force in the d-axis direction intersecting with the q-axis direction, preferably orthogonal to the q-axis direction. In the present embodiment, the transport controller 121 controls the current values of Iu, Iv, and Iw based on the position information of the carriage 161 obtained from the encoders 211 and thereby is able to control the position of the carriage 161 and the state of the work holder 103 at the same time.

In the present embodiment, as described above, the force in the d-axis direction intersecting with the q-axis direction, preferably orthogonal to the q-axis direction, which is the moving direction of the carriage 161, is applied to the work holder 103 and the permanent magnets 221 by the coil unit 207 arranged in the transport path 102. Thereby, the work holder 103 is driven in the d-axis direction. By being driven in the d-axis direction, the work holder 103 can be switched between a state of gripping and holding the work 101 between the work holder 103 and the carriage top plate 212 and a state of not gripping and thus releasing the work 101 from the carriage top plate 212.

According to the present embodiment, the coil unit 207 arranged in the transport path 102 is used to apply force in the d-axis direction that drives the work holder 103, which is a movable mechanism. It is thus unnecessary to secure a space which would otherwise be necessary to install a mechanism for driving the work holder 103 to change the state of the work 101. Therefore, according to the present embodiment, the work holder 103 on the carriage 161 can be driven without an increase in size of the transport system 2.

Further, in the present embodiment, it is not necessary to connect the plurality of carriages 161 or control the plurality of carriages 161 in synchronization for changing the state of the work holder 103, that is, the state of the work 101. Therefore, according to the present embodiment, the moving speed of the carriages 161 is not limited, and the complexity or the size is not increased in the transport system 2.

Further, even when the transport path 102 is a transport path curved with respect to the transport direction of the carriage 161, the state of the work holder 103 can be changed. Therefore, according to the present embodiment, flexibility in installation of the transport path 102 that is a track of the carriage 161 can be increased. For example, a transport system that circulates the carriages 161 and transports the works 101 can be easily configured by using the curved transport path 102.

As discussed above, according to the present embodiment, the work holder 103 that is a movable mechanism on the carriage 161 can be driven without an increase in size or complexity of the transport system 2. Note that a conceivable method of changing the state of the work on the carriage may be to provide an actuator on a carriage and a battery or drive-control means for driving the actuator and drive the actuator to change the state of the work. However, this case not only increases the size of the transport system of a work but also requires means for communicating with a control unit that performs motion control of the drive-control means and carriages. Further, since the transport weight increases, it is necessary to increase the drive force in driving the carriage. The present embodiment does not require the above and can drive the work holder 103 on the carriage 161 to change the state of the work 101.

Furthermore, in the present embodiment, the magnet catch 271 is provided above the work holder 103. When the work holder 103 moves in the (d+)-direction away from the coils 206 by a certain distance, absorption force due to magnetic force works between the magnet catch 271 and the work holder 103. This enables the magnet catch 271 to maintain the work holder 103 at a constant position even when Fd equals to zero.

In a state where the magnet catch 271 works, the distance between the coil unit 207 and the permanent magnets 221 changes. In this case, the thrust constants Cq and Cd change, respectively. The change in the thrust constants Cq and Cd in accordance with the position in the d-axis direction of the permanent magnets 221 will be described below by using FIG. 6A and FIG. 6B.

Figure 6A:
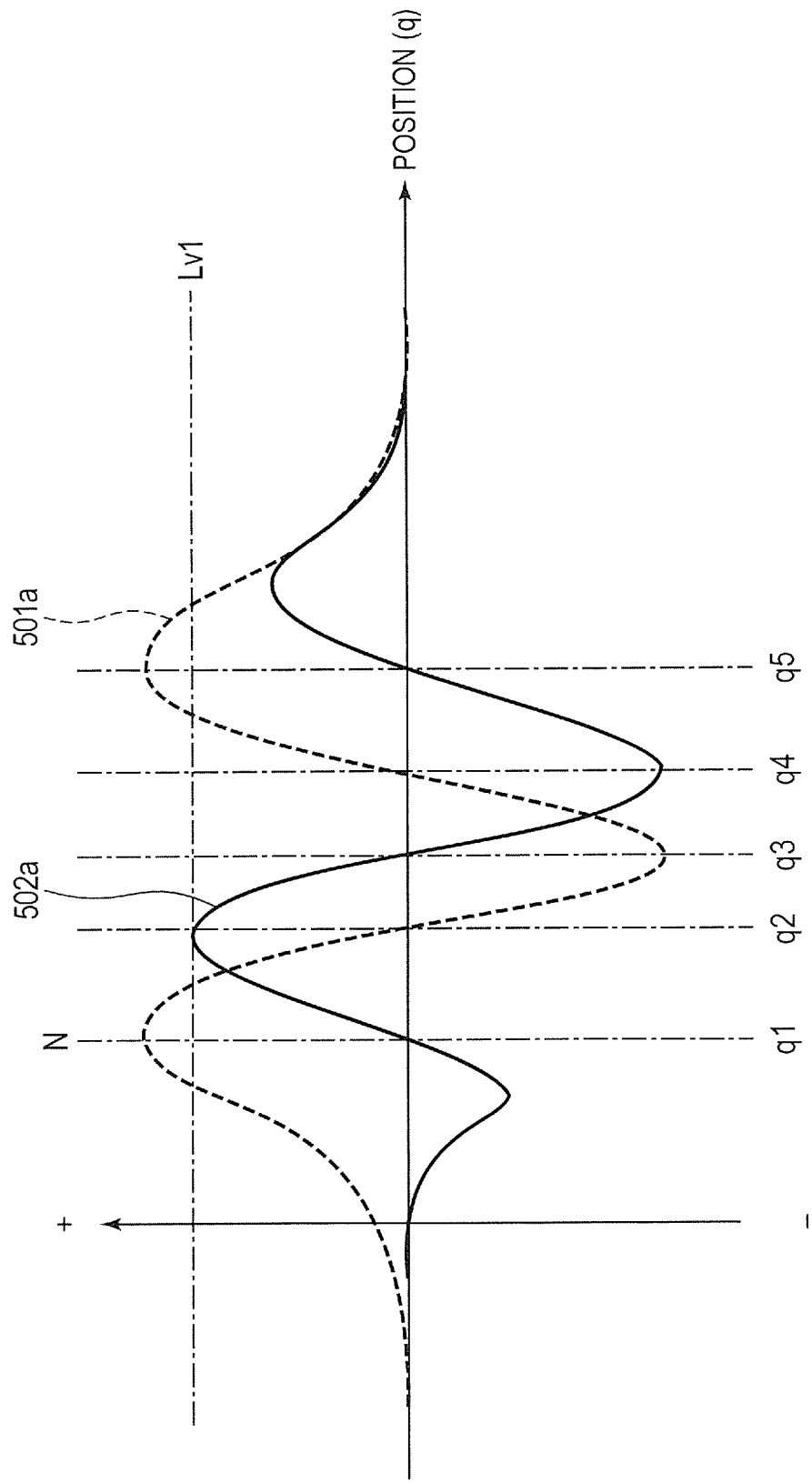
FIG. 6A is a graph illustrating a change in a thrust constant in a transport system according to the first embodiment of the present invention.
Figure 6B:
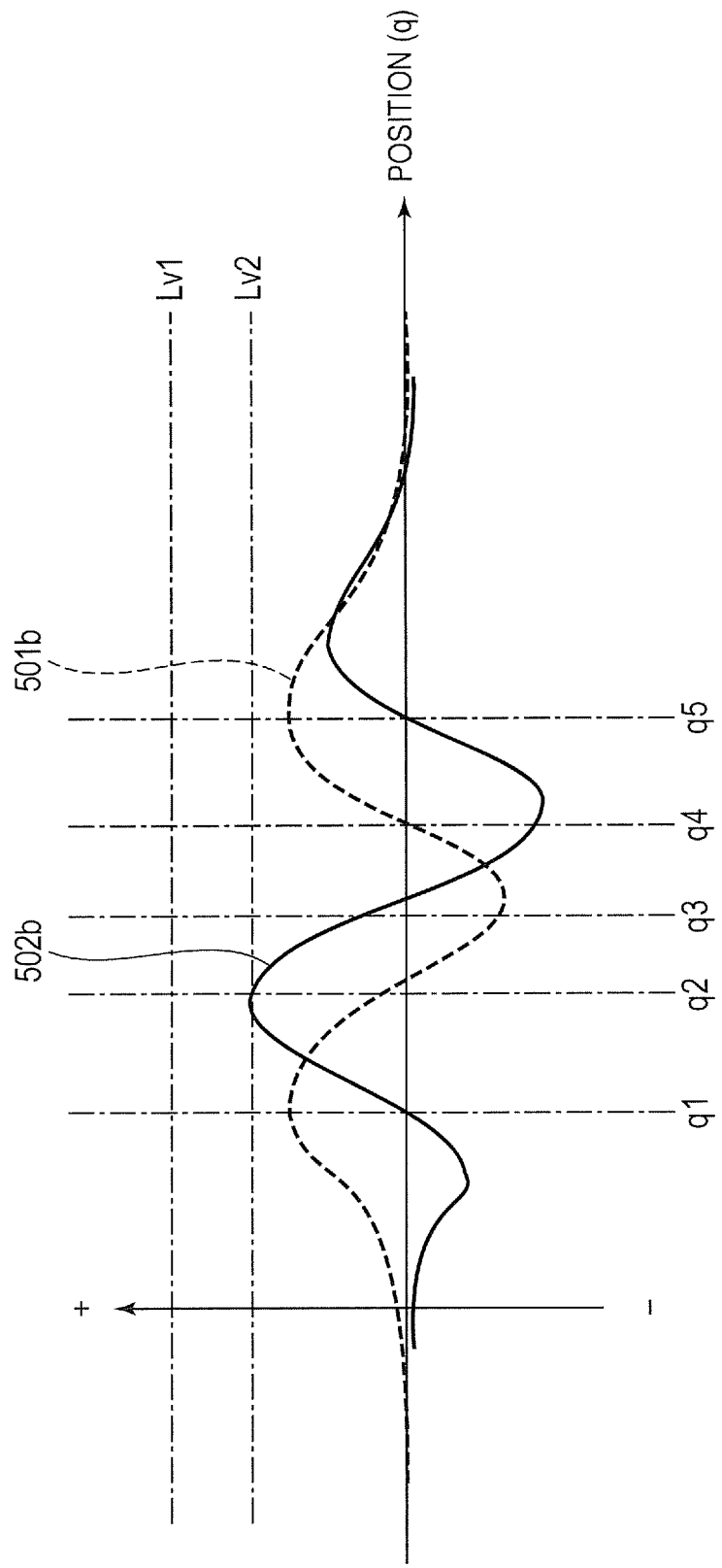
FIG. 6B is a graph illustrating a change in a thrust constant in the transport system according to the first embodiment of the present invention.

FIG. 6A and FIG. 6B schematically illustrate profiles 501 (501a, 501b) of interlinkage fluxes penetrating one coil 206 and profiles (502a, 502b) of thrust constants, where the position in the q-axis direction of the carriage 161 in the horizontal axis, respectively. The horizontal axis is different for respective coils 206.

Note that FIG. 6A and FIG. 6B illustrate the profiles 502 of the thrust constants that change in accordance with positions of respective coils 206, and the thrust constants Cq and Cd expressed by the equations (5) and (6) are obtained as below. That is, the thrust constants Cq and Cd are obtained by vector operations with the thrust constant profile 502 being further replaced with the q-axis current and d-axis current, respectively. In the present embodiment, in accordance with the position in the d-axis direction of the work holder 103, the thrust constants Cq and Cd are pre-calculated through an experiment or a simulation, and the pre-calculated thrust constants Cq and Cd can be used in calculation of Fq and Fd.

FIG. 6A schematically illustrates a case where the work holder 103 is located on the (d−)-side and the coils 206 and the permanent magnets 221 are relatively close in the d-axis direction in the present embodiment. On the other hand, FIG. 6B schematically illustrates a case where the work holder 103 is located on the (d+)-side and the coils 206 and the permanent magnets 221 are relatively distant in the d-axis direction.

In the case illustrated in FIG. 5B, three permanent magnets 221 change the polarities thereof in an alternating manner. Thus, as illustrated in FIG. 6A and FIG. 6B, the interlinkage flux profile 501 increases to the positive side at the position q1 and the position q5 and increases to the negative side at the position p3.

The magnitude of the thrust constant of each coil 206 is a derivative of the interlinkage flux at the position. Thus, as illustrated in FIG. 6A and FIG. 6B, the thrust constant profile 502 becomes zero at positions where the position derivative of the interlinkage flux profile 501 is zero, such as the positions q1, q3, and q5, for example.

FIG. 6A schematically illustrates changes in the interlinkage flux and the thrust constant when the magnet catch 271 does not work and the coil 206 and the permanent magnets 221 are relatively close in the d-axis direction. In contrast, FIG. 6B schematically illustrates changes in the interlinkage flux and the thrust constant when the magnet catch 271 works and the coil 206 and the permanent magnets 221 are relatively distant in the d-axis direction. In the case of FIG. 6B, because of the permanent magnets 221 being distant from the coil 206 in the d-axis direction, the magnetic resistance on the magnetic circuit increases resulting in a smaller thrust constant compared to the case illustrated in FIG. 6A.

For example, the maximum value of the thrust constant in the case illustrated in FIG. 6A is denoted as Lv1, and the maximum value of the thrust constant in the case illustrated in FIG. 6B is denoted as Lv2. When the coil 206 and the permanent magnets 221 become relatively distant from each other in the d-axis direction from the case illustrated in FIG. 6A to the case illustrated in FIG. 6B, the maximum value of the thrust constant changes and decreases from Lv1 to Lv2. Note that the magnitude of the change is different depending on the strength of the permanent magnets 221, the distance between the permanent magnets 211 and the coil unit 207, or the like.

Based on the thrust constant that changes in accordance with the position in the d-axis direction of the permanent magnets 221 as described above, the carriage controller 303, which is a control unit, can control the currents applied to the coils 206 of the coil unit 207 to control the carriage 161 and the work holder 103.

Note that the work holder 103 can move in the (d−)-direction by application of the force Fd in the (d−)-direction to the permanent magnets 221 from the coil unit 207. This enables the work holder 103 to again grip and press the work 101 between the work holder 103 and the carriage top plate 212 to clamp the work 101.

Figure 7:
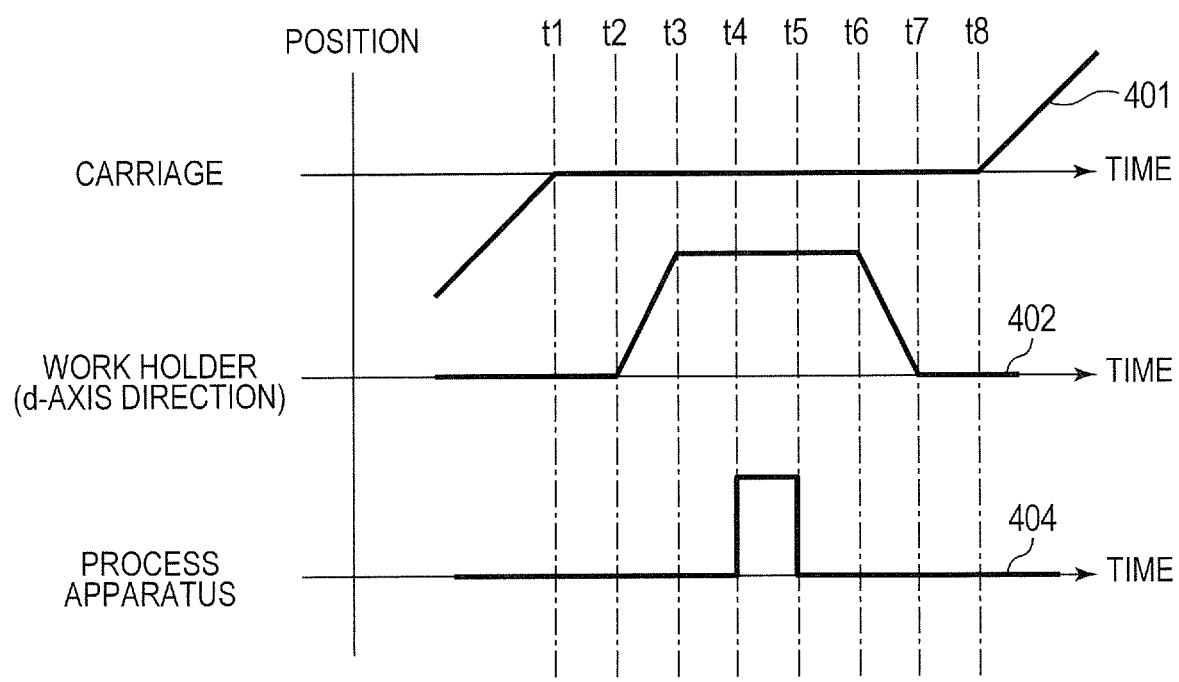
FIG. 7 is a timing chart illustrating motion of the carriage and a process apparatus according to the first embodiment of the present invention.

Next, the motion of the carriage 161 and the process apparatus 131 in the processing system 1 according to the present embodiment illustrated in FIG. 1 to FIG. 5B will be described by using FIG. 7. FIG. 7 is a timing chart illustrating the motion of the carriage 161 and the process apparatus 131 according to the present embodiment, in which the horizontal axis represents time and the vertical axis represents positions. In FIG. 7, the timing chart 401 on the upper row illustrates the position in the q-axis direction of the carriage 161. The timing chart 402 on the middle row illustrates the position in the d-axis direction of the work holder 103. The timing chart 404 on the lower row illustrates the position in the p-axis direction of the process apparatus 131c.

First, at the time t1, the carriage 161 holding no work 101 travels on the transport path 102 and stops at the position of the process apparatus 131c. The process apparatus 131c is an apparatus that supplies the work 101 on the carriage 161 and further picks out the work 101 from the carriage 161.

Subsequently, at the time t2, the work holder 103 on the carriage 161 is subjected to force in the (d+)-direction from the coil unit 207 as described above and starts a moving operation in the (d+)-direction. The work holder 103 completes the moving operation in the (d+)-direction at the time t3.

Subsequently, during the time t4 to the time t5, the process apparatus 131c projects into the carriage 161 side in the p-axis direction. The process apparatus 131c that has projected on the carriage 161 side inserts the work 101 between the carriage top plate 212 and the work holder 103.

Subsequently, at the time t6, the work holder 103 is subjected to force in the (d−)-direction from the coil unit 207 as described above and starts a moving operation in the (d−)-direction. The work holder 103 completes the moving operation in the (d−)-direction at the time t7.

Upon the completion of the moving operation in the (d−)-direction of the work holder 103, the work 101 is pressed between the work holder 103 and the carriage top plate 212 and held and fixed on the carriage 161. Thereby, the work 101 is in a clamp state. Accordingly, the work 101 is supplied on the carriage 161.

Subsequently, at the time t8, the carriage 161 holding the work 101 starts traveling on the transport path 102 toward the next position.

The carriage 161 travels on the transport path 102 and stops at the position of the process apparatus 131a and then the position of the process apparatus 131b. At the positions at the process apparatuses 131a and 131b, working processes are performed on the work 101 on the carriage 161 by the process apparatuses 131a and 131b, respectively.

Then, the carriage 161 that has exited the positions of the process apparatuses 131a and 131b travels on the transport path 102 and again reaches the position of the process apparatus 131c and is stopped. On the stopped carriage 161, the work holder 103 on the carriage 161 is subjected to force in the (d+)-direction from the coil unit 207 and performs a moving operation in the (d+)-direction as described above. Accordingly, the work holder 103 is in a state of being away from the work 101 and not holding and thus releasing the work 101. Thereby, the work 101 is in an unclamp state. In this state, the process apparatus 131c projects in the p-axis direction into the carriage 161 side and picks out the work 101 from the carriage 161.

At the process apparatuses 131a and 131b, working processes such as assembly of a component, application, or the like are performed on the transported work 101. An article such as an electronic device is manufactured by performing the working process on the work 101 using the process apparatuses 131a and 131b accordingly. Note that the process apparatuses 131a and 131b that perform the working processes are not limited to an apparatus that performs a particular working process, and any apparatus may be employed. Further, the article to be manufactured is not limited in particular, and any article may be manufactured. Various articles can be manufactured by the manufacturing method of an article using the processing system 1 according to the present embodiment.

Second Embodiment

A second embodiment of the present invention will be described by using FIG. 8A and FIG. 8B. Note that similar components to those of the first embodiment described above are labeled with the same references and the description thereof will be omitted or simplified.

The carriage 161 according to the present embodiment is different from the carriage 161 according to the first embodiment in the form of fixation of the permanent magnets 221a, 221b, and 221c. The details of the configuration of the carriage 161 according to the present embodiment will be described below by using FIG. 8A and FIG. 8B. FIG. 8A and FIG. 8B are schematic diagrams illustrating the carriage 161 and the transport path 102 according to the present embodiment, respectively. FIG. 8A is a diagram viewed from the q-axis direction, and the FIG. 8B is a diagram viewed from the p-axis direction. Note that, in FIG. 8B, a part of the casing 202 or the like that is unnecessary for the description is omitted.

In the carriage 161 according to the first embodiment illustrated in FIG. 5A and FIG. 5B, all of the plurality of permanent magnets 221a, 221b, and 221c are fixed to the work holder 103. In contrast, in the carriage 161 according to the present embodiment, a part of the plurality of the permanent magnets 221a, 221b, and 221c is fixed to the work holder 103. In the carriage 161 according to the present embodiment, as illustrated in FIG. 8A and FIG. 8B, the permanent magnets 221a and 221c of the plurality of the permanent magnets 221a, 221b, and 221c are directly fixed to the carriage top plate 212 without via the work holder 103. In the carriage 161 according to the present embodiment, only the permanent magnet 221b is fixed to the work holder 103. Such a form of fixation of the permanent magnets 221a, 221b, and 221c makes the carriage 161 according to the present embodiment different from the carriage 161 according to the first embodiment.

In the carriage 161 according to the present embodiment, the permanent magnets 221a and 221c are fixed directly to the carriage top plate 212. Thus, in the present embodiment, unlike the first embodiment, the force applied to the permanent magnets 221a and 221c by the coil unit 207 is transmitted to the carriage top plate 212 via none of the guide block 231, the linear guide 232, nor the bracket 209. Therefore, in the present embodiment, a superior controllability of the motion in the q-axis direction in particular can be obtained for the carriage 161, and more stable travelling of the carriage 161 can be realized. Note that the term of a superior controllability used herein refers to a state of having a flat frequency characteristic up to a higher frequency. Further, the force applied to the permanent magnets 221b by the coil unit 207 can also contribute to the motion in the q-axis direction of the carriage 161 in a similar manner to the first embodiment.

Also in the present embodiment, the force Fq in the q-axis direction and the force Fd in the d-axis direction that are independent of each other can be applied to the work holder 103 in a similar manner to the first embodiment. Note that, in the present embodiment, the work holder 103 moves in the (d+)-direction or the (d−)-direction in response to force in the d-axis direction applied by the coil unit 207 to the permanent magnet 221b fixed to the work holder 103 out of the permanent magnets 221a, 221b, and 221c. As illustrated in the present embodiment, the work holder 103 may be provided so as to be able to interlock with some of the plurality of permanent magnets 221.

Further, also in the present embodiment, the thrust constants Cq and Cd changes when the work holder 103 moves in the d-axis direction in a similar manner to the first embodiment. Also in the present embodiment, as described using FIG. 6A and FIG. 6B, it is possible to control the carriage 161 by pre-calculating the thrust constants Cq and Cd in accordance with the position in the d-axis direction through an experiment or a simulation and using the pre-calculated thrust constants Cq and Cd for calculation of Fq and Fd.

Since the motion of the carriage 161 and the process apparatuses 131 according to the present embodiment are also the same as that in the first embodiment, the description thereof will be omitted.

Third Embodiment

A third embodiment of the present invention will be described by using FIG. 9A to FIG. 12. Note that similar components to those of the first and second embodiments described above are labeled with the same references and the description thereof will be omitted or simplified.

Figure 9A:
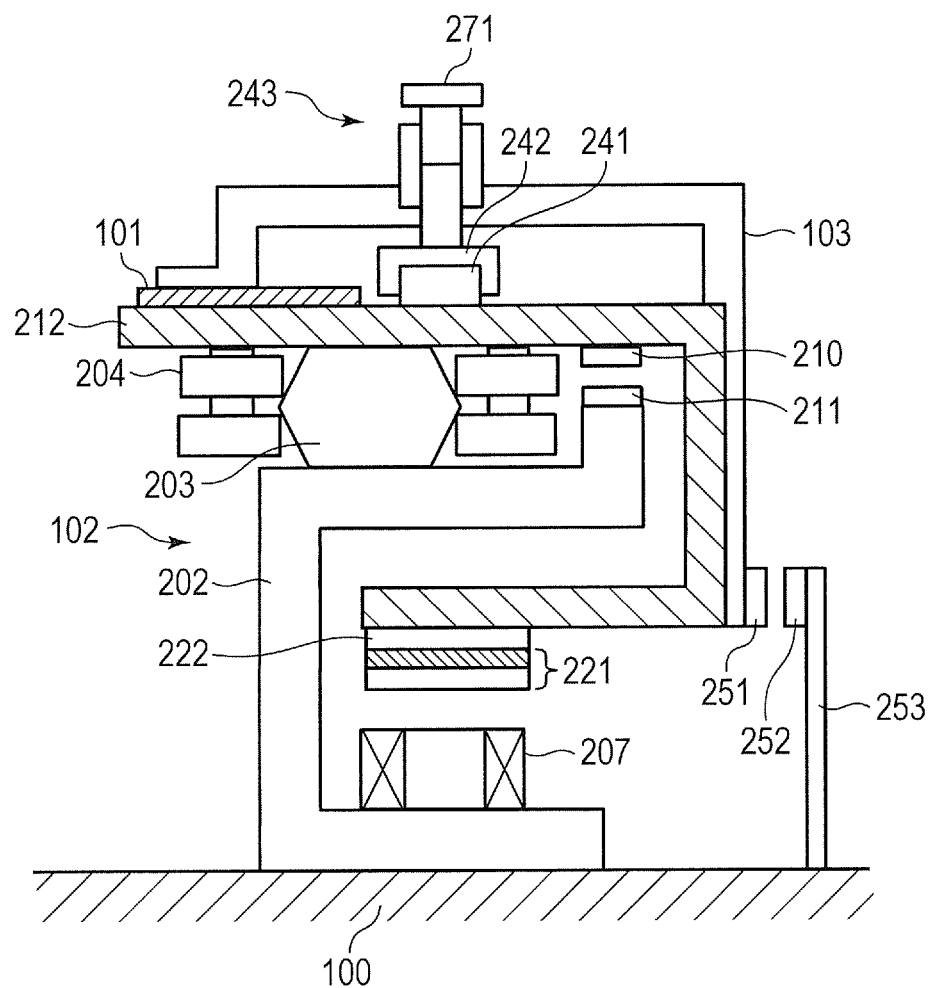
FIG. 9A is a schematic diagram illustrating a carriage and a transport path according to a third embodiment of the present invention.

The carriage 161 according to the present embodiment is different from the carriage 161 according to the first embodiment in that the work holder 103 and the permanent magnets 221 fixed thereto are movable also in the q-axis direction. The configuration of the carriage 161 according to the present embodiment will be described below in detail by using FIG. 9A and FIG. 9B. FIG. 9A and FIG. 9B are schematic diagrams illustrating the carriage 161 and the transport path 102 according to the present embodiment, respectively. FIG. 9A is a diagram viewed from the q-axis direction, and the FIG. 9B is a diagram viewed from the p-axis direction. Note that, in FIG. 9B, a part of the casing 202 or the like that is unnecessary for the description is omitted.

Figure 8A:
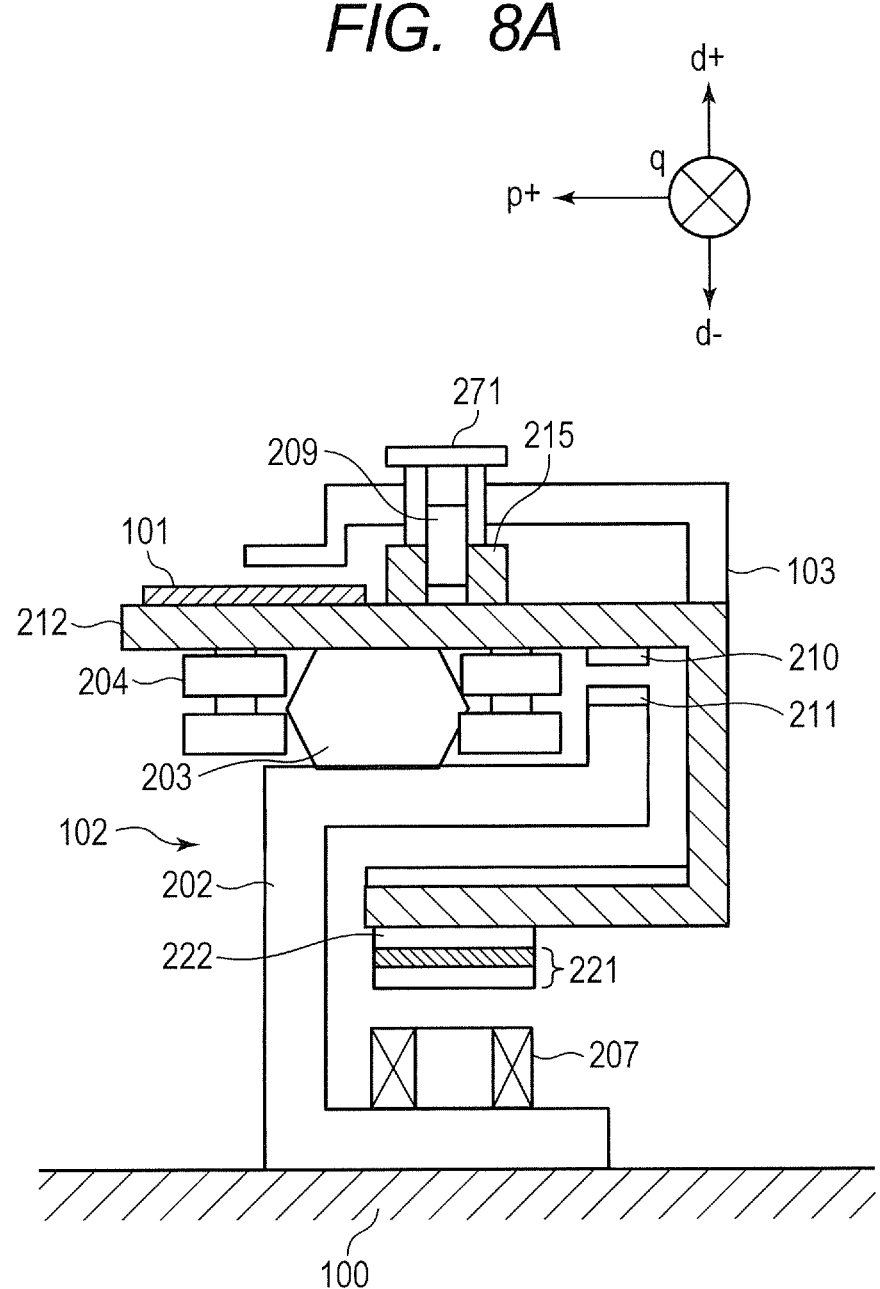
FIG. 8A is a schematic diagram illustrating a carriage and a transport path according to a second embodiment of the present invention.
Figure 8B:
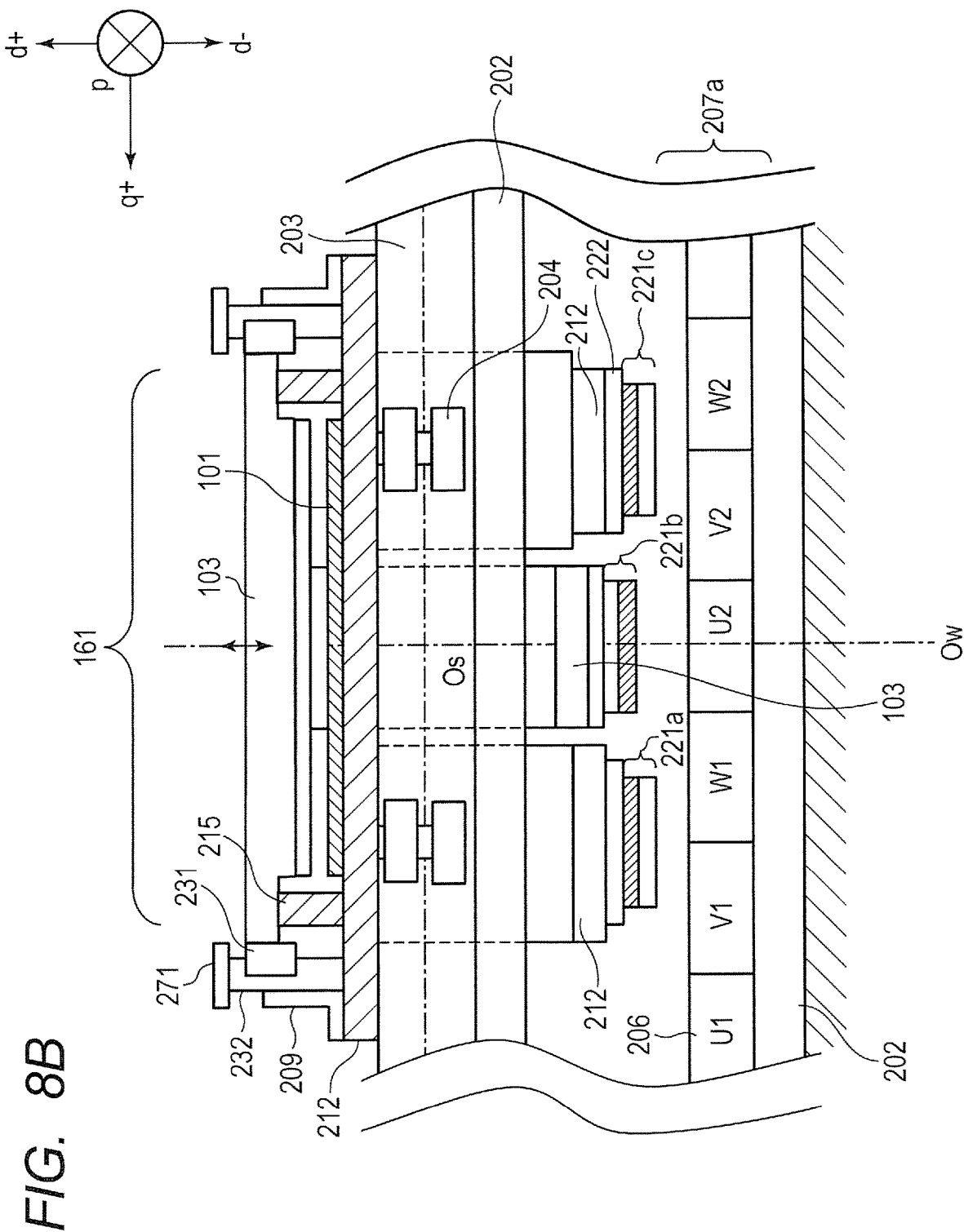
FIG. 8B is a schematic diagram illustrating the carriage and the transport path according to the second embodiment of the present invention.

In the carriage 161 according to the first embodiment illustrated in FIG. 5A and FIG. 5B and the carriage 161 according to the second embodiment illustrated in FIG. 8A and FIG. 8B, the work holder 103 and the permanent magnets 221 fixed thereto are configured to be movable only in the d-axis direction.

In contrast, in the carriage 161 according to the present embodiment illustrated in FIG. 9A and FIG. 9B, the work holder 103 and the permanent magnets 221 fixed thereto are configured to be movable not only in the d-axis direction but also in the q-axis direction with respect to the carriage top plate 212.

As illustrated in FIG. 9A, a scale 251 is fixed to the work holder 103. An encoder 252 is fixed to the frame 100 via the bracket 253 at a position where the encoder 252 can face the scale 251. The encoder 252 can read the scale 251 and output a mutual relative positional relationship.

As illustrated in FIG. 9A and FIG. 9B, a linear guide 241 extending in the q-axis direction is provided on the carriage top plate 212. The guide block 242 is guided so as to be movable in the q-axis direction along the linear guide 241.

A holder unit 243 in which the work holder 103, the guide block 231, the linear guide 232, the magnet catch 271, the elastic member 215, and the bracket 209 of the first embodiment are integrated is fixed to the guide block 242. The holder unit 243 including the work holder 103 is movable in the q-axis direction together with the guide block 242. Further, the work holder 103 is configured to be movable in the d-axis direction together with the guide block 231 in the same manner as in the first embodiment.

Further, the permanent magnets 221a, 221b, and 221c as the permanent magnets 221 are fixed to the work holder 103 in the same manner as in the first embodiment. The permanent magnets 221a, 221b, and 221c fixed to the work holder 103 are also movable in the q-axis direction and the d-axis direction together with the work holder 103.

Furthermore, in the present embodiment, the plurality of permanent magnets 221 are fixed to the carriage top plate 212 via the yoke 222. FIG. 9B illustrates a case where three permanent magnets 221x, 221y, and 221z as the permanent magnets 221 are fixed to the carriage top plate 212. The plurality of permanent magnets 221 fixed to the carriage top plate 212 are arranged so as to have alternating polarities. In the case illustrated in FIG. 9B, the permanent magnets 221x and 221z are fixed such that the polarity thereof on the coil 206 side is the S-pole. On the other hand, the permanent magnet 221y is fixed such that the polarity thereof on the coil 206 side is the N-pole. The permanent magnets 221 are fixed under the carriage top plate 212 so as to be able to face the coils 206 of the coil unit 207 on the transport path 102.

In the case illustrated in FIG. 9B, the U-phase coils 206 are denoted as U1, U2, U3, U4, and U5, the V-phase coils 206 are denoted as V1, V2, V3, and V4, and the W-phase coils 206 are denoted as W1, W2, W3, and W4. The coils U1, V1, W1, U2, V2, W2, U3, V3, W3, U4, V4, W4, and U5 are aligned in the (q−)-direction in this order. The coils U1, V1, W1, U2, V2, and W2 form one coil unit 207i. The coils U3, V3, W3, U4, V4, and W4 form another coil unit 207j separate from the coil unit 207i. Thus, separate control currents can be applied to the two coil units 207i and 207j.

In the present embodiment, as described above, separate control currents can be applied to the two coil units 207i and 207j as described above. Thus, in the present embodiment, the position in the q-axis direction of the carriage top plate 212 and the positions in the q-axis direction and the d-axis direction of the work holder 103 can be controlled independently for the carriage 161.

Figure 10:
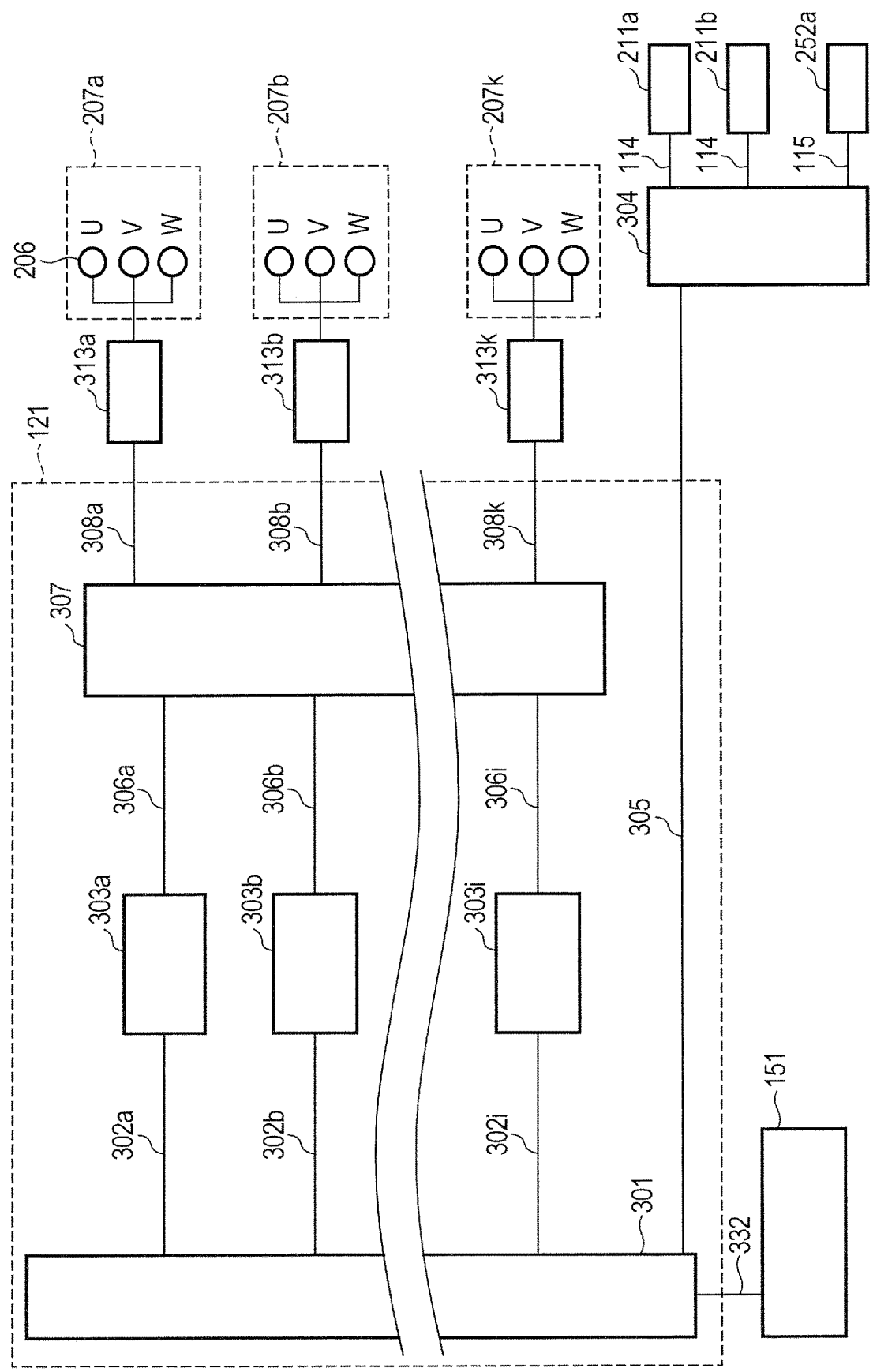
FIG. 10 is a block diagram illustrating a system configuration for controlling the carriage according to the third embodiment of the present invention.

Next, the configuration for controlling the carriage 161 according to the present embodiment will be described by using FIG. 10. FIG. 10 is a block diagram illustrating a system configuration for controlling the carriage 161 according to the present embodiment and illustrates a control method of the transport system according to the present embodiment. The system configuration illustrated in FIG. 10 further includes an encoder 252a as the encoder 252 in addition to the system configuration illustrated in FIG. 4.

As illustrated in FIG. 10, the encoder 252a is communicably connected to the carriage position calculation unit 304. The carriage position calculation unit 304 calculates the position in the q-axis direction of the work holder 103 based on information 115 output from the encoder 252a. The carriage position calculation unit 304 transmits information on the calculated position in the q-axis direction of the work holder 103 to the transport controller 121. The information on the position in the q-axis direction of the work holder 103 transmitted to the transport controller 121 is input to the carriage group controller 301 of the transport controller 121.

The carriage group controller 301 selects the coil unit 207 to be controlled, based on the input information on the position in the q-axis direction of the work holder 103. Furthermore, the carriage group controller 301 transmits the current control information 306 including a current instruction value of the selected coil unit 207 to the coil unit control unit 307 via the carriage controller 303. In the case of the arrangement illustrated in FIG. 9B, the current control information 306 including current instruction values of the coil units 207i and 207j may be transmitted to the coil unit control unit 307.

The coil unit control unit 307 transmits the current instruction value 308 to the current controller 313 associated with the selected coil unit 207 based on the transmitted current control information 306. The current controller 313 controls a current value and applies a current to the selected coil unit 207 based on the transmitted current instruction value 308. Accordingly, in the case of the arrangement illustrated in FIG. 9B, currents are applied to the coil units 207i and 207j. Thereby, the position in the q-axis direction of the carriage top plate 212 and the positions in the q-axis direction and the d-axis direction of the work holder 103 can be independently controlled.

In the case of the arrangement illustrated in FIG. 9B, force in the q-axis direction can be applied by the coil unit 207i to the permanent magnets 221x, 221y, and 221z and the carriage top plate 212. Thereby, the position in the q-axis direction of the carriage top plate 212, that is, the position in the q-axis direction of the carriage 161 can be controlled.

Further, in the case of the arrangement illustrated in FIG. 9B, force in the q-axis direction and force in the d-axis direction can be applied to the permanent magnets 221a, 221b, and 221c and the work holder 103 by the coil unit 207j. Thereby, the position in the q-axis direction and the position in the d-axis direction of the work holder 103 can be controlled. Controlling the position in the d-axis direction of the work holder 103 allows the work holder 103 to grip and hold the work 101 between the work holder 103 and the carriage top plate 212 in the same manner as the first embodiment. Further, controlling the position in the q-axis direction of the work holder 103 allows the work holder 103 to change the position to grip the work 101.

In the present embodiment, force in the q-axis direction is also applied to the work holder 103 and the permanent magnets 221 by the coil unit 207 arranged in the transport path 102, and thereby the work holder 103 is driven in the q-axis direction as described above. This enables the work holder 103 to change the position to grip the work 101 between the work holder 103 and the carriage top plate 212.

According to the present embodiment, the coil unit 207 arranged in the transport path 102 is used in order to apply force in the q-axis direction for driving the work holder 103, which is a movable mechanism. Thus, according to the present embodiment, in a similar manner to the first and second embodiment, the work holder 103 on the carriage 161 can be driven without an increase in size of the transport system 2. Furthermore, according to the present embodiment, since the work holder 103 can be driven not only in the d-axis direction but also in the q-axis direction, more complex driving of the work holder 103 can be realized.

Figure 11:
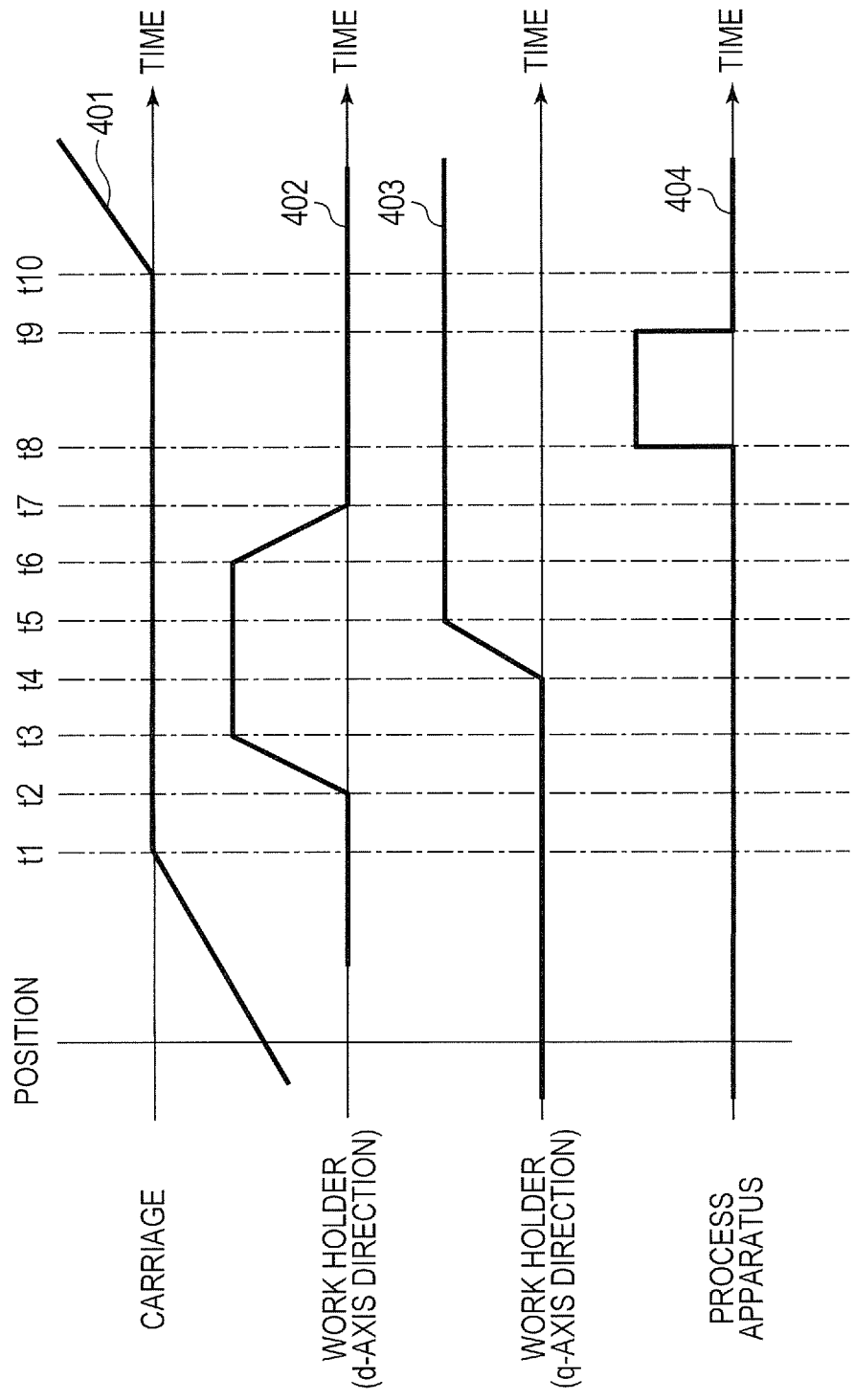
FIG. 11 is a timing chart illustrating motion of the carriage and a process apparatus according to the third embodiment of the present invention.
Figure 12:
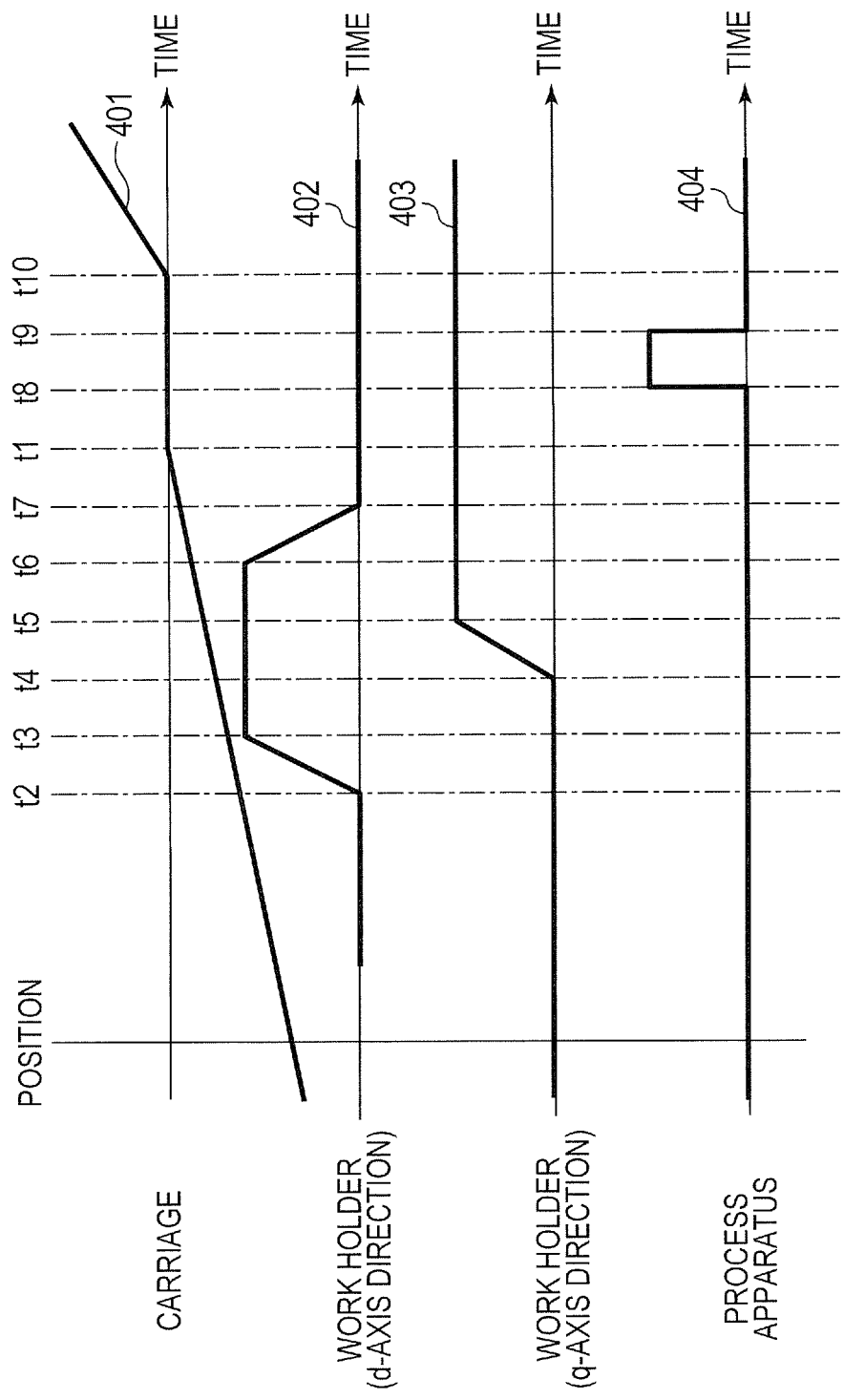
FIG. 12 is a timing chart illustrating motion of the carriage and the process apparatus according to the third embodiment of the present invention.

Next, the motion of the carriage 161 and the process apparatus 131 in the processing system according to the present embodiment will be described by using FIG. 11 and FIG. 12. Note that the configuration of the processing system is the same as the configuration illustrated in FIG. 1. FIG. 11 is a timing chart illustrating the motion of the carriage 161 and the process apparatus 131 according to the present embodiment and illustrates a case where there is a moving operation in the d-axis direction and the q-axis direction of the work holder 103 during the carriage 161 being stopped. Further, FIG. 12 is a timing chart illustrating other motion of the carriage 161 and the process apparatus 131 according to the present embodiment and illustrates a case where there is a moving operation in the d-axis direction and the q-axis direction of the work holder 103 during the carriage 161 being traveling. In FIG. 11 and FIG. 12, the horizontal axis represents time, and the vertical axis represents positions. In FIG. 11 and FIG. 12, the timing chart 401 on the top row illustrates the position in the q-axis direction of the carriage 161. The timing chart 402 on the second row from the top illustrates the position in the d-axis direction of the work holder 103. The timing chart 403 on the third row from the top illustrates the position in the q-axis direction of the work holder 103. The timing chart 404 on the bottom row illustrates the position in the p-axis direction of the process apparatus 131.

First, the case illustrated in FIG. 11 will be described. At the time t1, the carriage 161 holding the work 101 and traveling stops at any of the positions of the process apparatus 131. Note that the work 101 is supplied on the carriage 161 and the supplied work 101 is in a clamp state in the same manner as in the first embodiment.

Subsequently, at the time t2, the work holder 103 on the carriage 161 is subjected to force in the (d+)-direction from the coil unit 207 and starts a moving operation in the (d+)-direction. The work holder 103 completes the moving operation in the (d+)-direction at the time t3. This causes the work holder 103 to temporarily be in a state of away from the work 101 and not holding the work 101. That is, the work 101 is temporarily in an unclamp state.

Subsequently, at the time t4, the work holder 103 is subjected to force in the q-axis direction from the coil unit 207 and starts a moving operation in the q-axis direction. The work holder 103 completes the moving operation in the q-axis direction at the time t5.

Subsequently, at the time t6, the work holder 103 is subjected to force in the (d−)-direction from the coil unit 207 and starts a moving operation in the (d−)-direction. The work holder 103 completes the moving operation in the (d−)-direction at the time t7. Thereby, the work holder 103 grips and holds the work 101 between the work holder 103 and the carriage top plate 212. Accordingly, the work 101 is again in a clamp state. In the present embodiment, by the work holder 103 moving in the q-axis direction as described above, the position in the q-axis direction where the work holder 103 holds the work 101 can be changed.

Subsequently, during the time t8 to the time t9, the process apparatus 131 projects into the carriage 161 side in the p-axis direction. The process apparatus 131 that has projected into the carriage 161 side performs a working process on the work 101 on the carriage 161.

Subsequently, at the time t10, the carriage 161 holding the work 101 on which the working process has been performed starts traveling on the transport path 102 toward the position of the next process apparatus 131.

The work 101 on which working processes have been performed by the plurality of process apparatuses 131 as above is picked out from the carriage 161 in the same manner as in the first embodiment. An article such as an electronic device is manufactured by performing working processes on the work 101 using the plurality of process apparatuses 131.

On the other hand, the case illustrated in FIG. 12 is different from the case illustrated in FIG. 11 in that the work holder 103 on the carriage 161 performs a moving operation in the d-axis direction and the q-axis direction when the carriage is traveling.

That is, in the case illustrated in FIG. 11, the time t1 when the traveling carriage 161 stops is before the time t2 when the work holder 103 starts the moving operation in the (d+)-direction. In contrast, in the case illustrated in FIG. 12, the time t1 when the traveling carriage 161 stops is after the time t7 when the work holder 103 completes the moving operation in the (d−)-direction and before the time t8. In the case illustrated in FIG. 12, the process apparatus 131 stands by for the carriage 161 stopping at the time t1 and performs a working process on the work 101 on and after the time t8 in the same manner as in the case illustrated in FIG. 11.

In the case illustrated in FIG. 12, since moving operations in the d-axis direction and the q-axis direction of the work holder 103 are performed during the carriage 161 being traveling, it is possible to reduce time during which the carriage 161 is stopped compared to the case illustrated in FIG. 11. Therefore, according to the case illustrated in FIG. 12, a working process can be efficiently performed on the plurality of works 101 transported by the plurality of carriage 161.

Fourth Embodiment

A fourth embodiment of the present invention will be described by using FIG. 13A, FIG. 13B and FIG. 14. Note that similar components to those of the first to third embodiments described above are labeled with the same references and the description thereof will be omitted or simplified.

The basic configuration of the carriage 161 or the like according to the present embodiment is the same as the configuration of the carriage 161 or the like according to the third embodiment illustrated in FIG. 9A and FIG. 9B. The carriage 161 according to the present embodiment is different from the carriage 161 according to the third embodiment in that the work holder 103 is configured to be movable only in the q-axis direction. The configuration of the carriage 161 according to the present embodiment will be described below in detail by using FIG. 13A and FIG. 13B. FIG. 13A and FIG. 13B are schematic diagrams illustrating the carriage 161 and the transport path 102 according to the present embodiment, respectively. FIG. 13A is a diagram viewed from the q-axis direction, and the FIG. 13B is a diagram viewed from the p-axis direction. Note that, in FIG. 13B, a part of the casing 202 or the like that is unnecessary for the description is omitted.

Figure 13A:
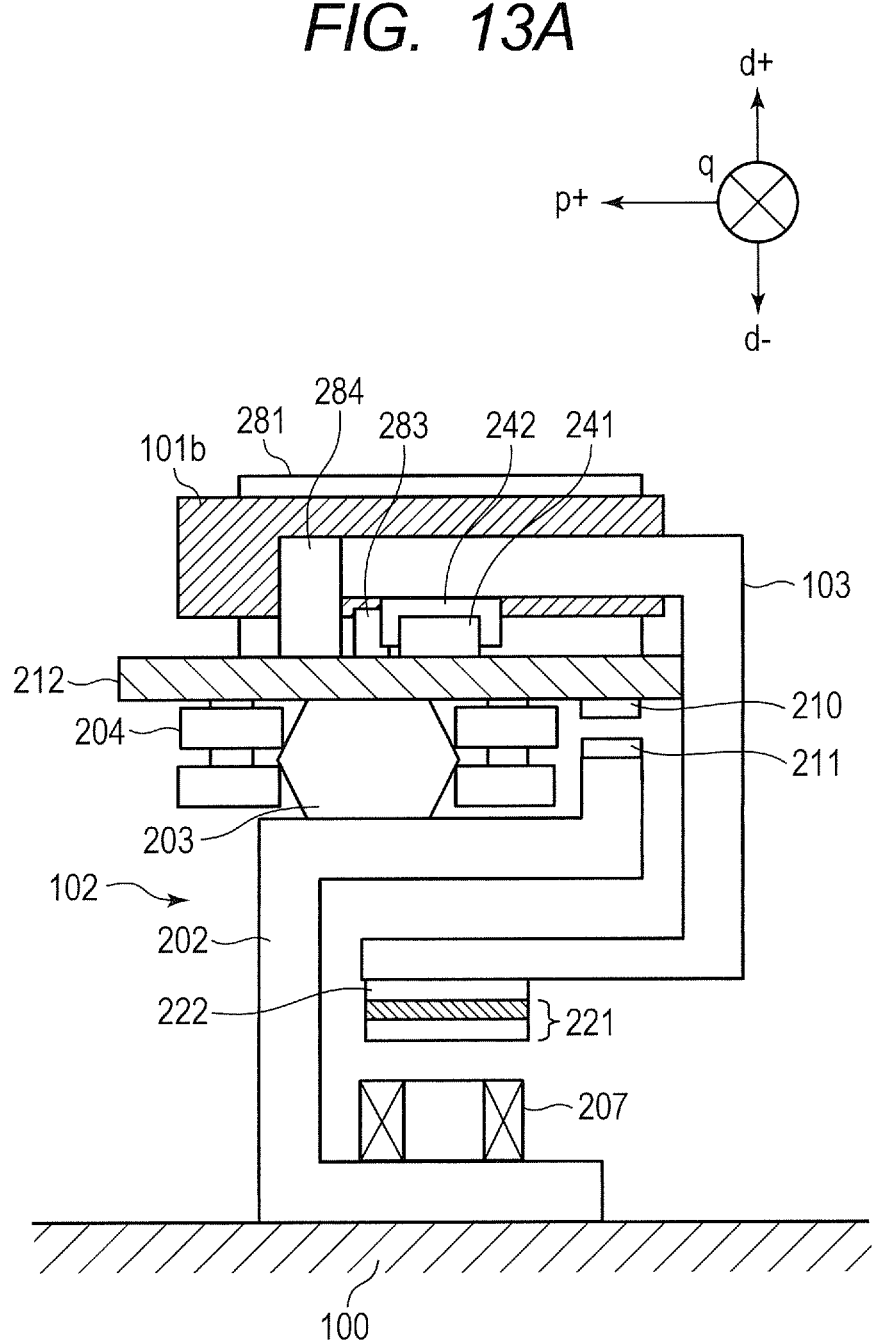
FIG. 13A is a schematic diagram illustrating a carriage and a transport path according to a fourth embodiment of the present invention.
Figure 13B:
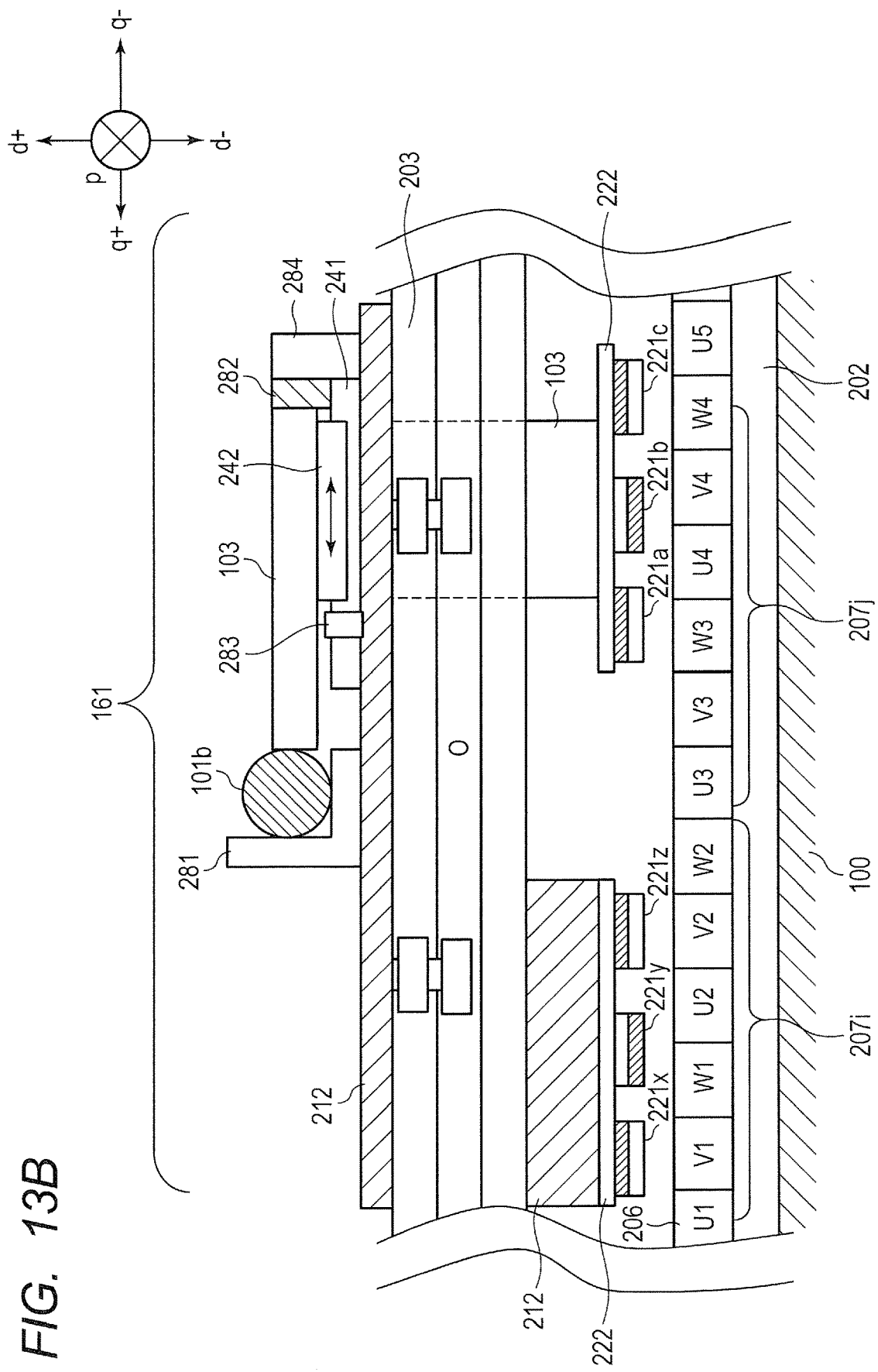
FIG. 13B is a schematic diagram illustrating the carriage and the transport path according to the fourth embodiment of the present invention.
Figure 14:
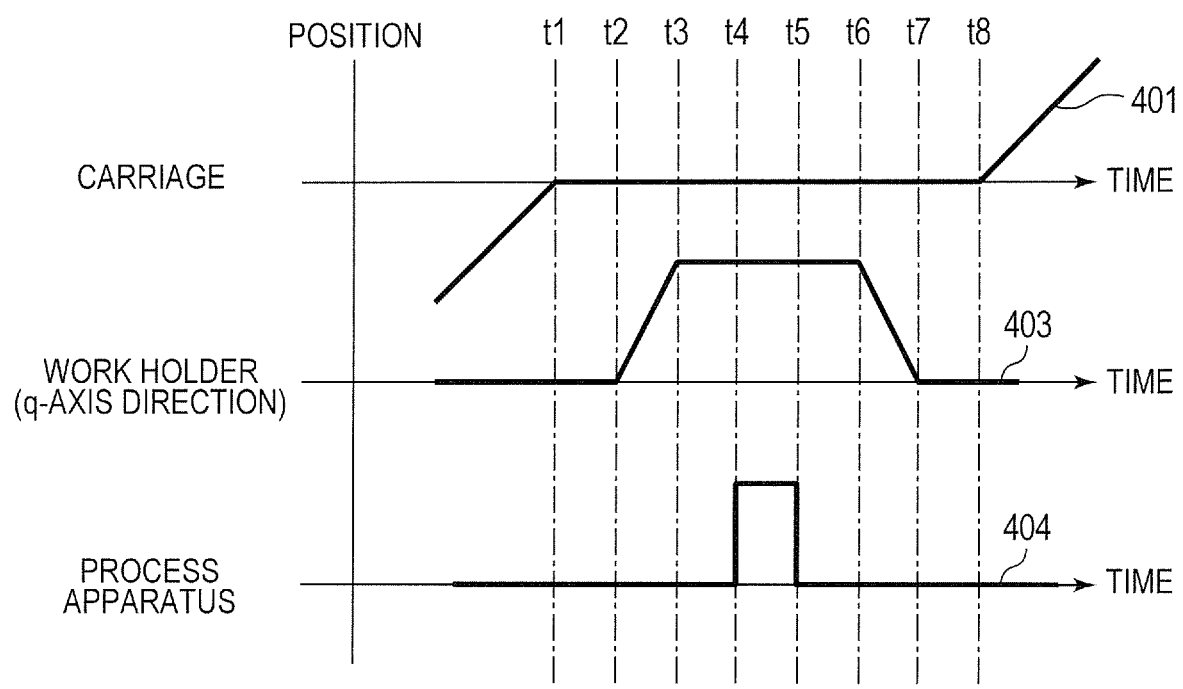
FIG. 14 is a timing chart illustrating motion of the carriage and a process apparatus according to the fourth embodiment of the present invention.

As illustrated in FIG. 13A and FIG. 13B, the linear guide 241 extending in the q-axis direction is provided on the carriage top plate 212. A work bracket 281 is provided on the carriage top plate 212 on one end side in the q-axis direction of the linear guide 241. The guide block 242 is guided so as to be movable in the q-axis direction along the linear guide 241.

The work holder 103 is attached and fixed to the guide block 242. One end of the work holder 103 faces the work bracket 281. The other end of the work holder 103 is attached via an elastic member 282 to the bracket 284 provided to the carriage top plate 212. The elastic member 282 may be, for example, a spring, a rubber, or the like. The elastic member 282 generates force in the q-axis direction between the bracket 284 and the work holder 103. The work holder 103 and the permanent magnets 221 fixed thereto are configured to be movable in the q-axis direction together with the guide block 242 while subjected to the force in the (q+)-direction from the elastic member 282.

The bracket 283 that restricts the movable range of the guide block 242 is provided to the linear guide 241. The bracket 283 restricts the movable range of the guide block 242 to restrict the interval between the work holder 103 fixed on the guide block 242 and the work bracket 281 to be greater than or equal to a predetermined value.

The permanent magnets 221a, 221b, and 221c as the permanent magnets 221 are fixed to the work holder 103 in the same manner as in the third embodiment. Further, the permanent magnets 221x, 221y, and 221z as the permanent magnets 221 are fixed to the carriage top plate 212 in the same manner as in the third embodiment.

In the case of the arrangement illustrated in FIG. 13B, force in the q-axis direction can be applied to the permanent magnets 221x, 221y, and 221z and the carriage top plate 212 by the coil unit 207i in the same manner as in the third embodiment. Thereby, the position in the q-axis direction of the carriage top plate 212, that is, the position in the q-axis direction of the carriage 161 can be controlled.

Further, in the case of the arrangement illustrated in FIG. 13B, force in the q-axis direction can be applied to the permanent magnets 221a, 221b, and 221c and the work holder 103 by the coil unit 207j. Thereby, the position in the q-axis direction of the work holder 103 can be controlled.

In the case illustrated in FIG. 13A and FIG. 13B, a cylindrical or columnar work 101b is placed on the work bracket 281 such that the center axis thereof runs in the p-axis direction. The work holder 103 moves in the (q+)-direction in response to force in the (q+)-direction from the coil unit 207j and grips and holds the work 101b between the work holder 103 and the work bracket 281.

When the work holder 103 is not subjected to force from the coil unit 207j and does not grip the work 101b, the guide block 242 stops at a position in contact with the bracket 283. At this time, the interval between the work bracket 281 and the work holder 103 is smaller than the width in the q-axis direction of the work 101b. Accordingly, the interval between the work holder 103 and the work bracket 281 is restricted by the bracket 283 to be greater than or equal to a predetermined value that is smaller than the width in the q-axis direction of the work 101b.

In the present embodiment, as described above, force in the q-axis direction is applied to the work holder 103 and the permanent magnets 221 by the coil unit 207 arranged in the transport path 102 to drive the work holder 103 in the q-axis direction. This enables the work holder 103 to be switched between a state of gripping and holding the work 101b between the work holder 103 and the work bracket 281 and a state of not gripping and thus releasing the work 101b from the work bracket 281.

According to the present embodiment, the coil unit 207 arranged in the transport path 102 is used in order to apply force in the q-axis direction that drives the work holder 103 that is a movable mechanism. Therefore, according to the present embodiment, the work holder 103 on the carriage 161 can be driven without an increase in size of the transport system 2 in the same manner as in the first to the third embodiments.

Next, the motion of the carriage 161 and the process apparatus 131 in the processing system according to the present embodiment will be described by using FIG. 14. FIG. 14 is a timing chart illustrating the motion of the carriage 161 and the process apparatus 131 according to the present embodiment, in which the horizontal axis represents time, and the vertical axis represents positions. In FIG. 14, the timing chart 401 on the upper row illustrates the position in the q-axis direction of the carriage 161. The timing chart 403 on the middle row illustrates the position in the q-axis direction of the work holder 103. The timing chart 404 on the lower row illustrates the position in the p-axis direction of the process apparatus 131c.

First, at the time t1, the carriage 161 holding no work 101 travels on the transport path 102 and stops at a position of the process apparatus 131c.

Subsequently, at the time t2, the work holder 103 on the carriage 161 is subjected to force in the (q−)-direction from the coil unit 207 and starts a moving operation in the (q−)-direction. The work holder 103 completes the moving operation in the (q−)-direction at the time t3.

Subsequently, during the time t4 to the time t5, the process apparatus 131c projects into the carriage 161 side in the p-axis direction. The process apparatus 131c that has projected into the carriage 161 side inserts the work 101b between the work bracket 281 and the work holder 103, or replaces the work 101b therebetween.

Subsequently, at the time t6, force in the (q+)-direction is applied to the work holder 103 by the coil unit 207, and the work holder 103 is controlled to move in the (q+)-direction. In response, the work holder 103 subjected to the force in the (q+)-direction from the coil unit 207 is pushed in the (q+)-direction by the elastic member 282 to come into contact with the work 101b at the time t7. This causes the work holder 103 to grip and hold the work 101b between the work holder 103 and the work bracket 281. Accordingly, the work 101b is supplied to the carriage 161, or the work 101b on the carriage 161 is replaced.

Note that, during the moving operation of the work holder 103 in the (q−)-direction and the (q+)-direction, the position of the q-axis direction of the carriage 161 is maintained at a predetermined position. In the case of the arrangement illustrated in FIG. 13B, the position in the q-axis direction of the carriage 161 is maintained by applying force in the q-axis direction to the permanent magnets 221x, 221y, and 221z and the carriage top plate 212 by using the coil unit 207i.

Subsequently, at the time t8, the carriage 161 holding the work 101b starts traveling on the transport path 102 toward the next position. The carriage 161 stops at the process apparatus 131a and then the process apparatus 131b, and working processes are performed on the work 101b by the process apparatuses 131a and 131b. Then, the carriage 161 again reaches the position of the process apparatus 131c.

At the process apparatus 131c that the carriage 161 has again reached, the work holder 103 is again subjected to the force in the (q−)-direction from the coil unit 207 to perform a moving operation in the (q−)-direction. Once the work holder 103 moves in the (q−)-direction and the work 101b is not held by the work holder 103, the process apparatus 131c picks out the work 101b.

Note that, in the present embodiment, unlike the third embodiment, no scale is provided to the work holder 103. However, the position of the carriage 161 can be calculated by using the scale 210 and the encoders 211. In the present embodiment, the moving amount in the q-axis direction of the work holder 103 is very small. It is therefore possible to calculate the position of the work holder 103 based on the position of the carriage 161 and apply force in the (q−)-direction or the (q+)-direction to the permanent magnets 221a, 221b, and 221c by using the coil unit 207.

Further, in the present embodiment, force in the q-axis direction is applied to the work holder 103 while the position in the q-axis direction of the carriage 161 being maintained. In this case, the force in the q-axis direction applied to the work holder 103 may work as disturbance in maintaining the position of the carriage 161. However, the magnitude and the direction of the force in the q-axis direction applied to the work holder 103 can be derived in advance by calculation.

Thus, the carriage controller 303 that is a control unit that maintains the position of the carriage 161 can calculate in advance the magnitude and the direction of the force in the q-axis direction applied to the work holder 103 and feedforward-control the position of the carriage 161 based on the calculation result. Thereby, it is possible to suppress the positional fluctuation of the carriage 161 due to the force in the q-axis direction applied to the work holder 103. Note that, also in the third embodiment described above, the same feedforward control as in the present embodiment can be performed.

Modified Embodiments

The present invention is not limited to the embodiments described above, and various modifications are possible. For example, while the case where the coil unit 207 is configured to be capable of three-phase driving of the coils 206 has been described as an example in the above embodiments, the invention is not limited thereto, and the coil unit 207 may be configured to be capable of other driving than the three-phase driving. For example, the coil unit 207 may be configured such that the current values of the coils 206 can be separately controlled and configured to be able to drive the coils 206 without limitation such as the equation (1).

Further, while the case where force in the d-axis direction or the q-axis direction is controlled in order to switch the state of the work 101 or 101b between a clamp state and an unclamp state by using the work holder 103 has been described in the above embodiments, the invention is not limited thereto. It is possible to drive a variety of actuators or other movable mechanisms by controlling and applying force in the d-axis direction or the q-axis direction in the same manner as in the above embodiments other than the mechanism of switching the state of the work 101 or 101b between a clamp state and an unclamp state. For example, the state or the attitude of the work on the carriage may be converted by driving a movable mechanism such as a link mechanism, a gear, or the like using force in the d-axis direction or the q-axis direction similar to the above embodiments.

According to the present invention, it is not necessary to secure a space for installing a mechanism that converts the state or the attitude of a work on a carriage, or it is not necessary to connect a plurality of carriages or control a plurality of carriage in synchronization. Therefore, according to the present invention, it is possible to drive the movable mechanism on the carriage to convert the state or the attitude of the work on the carriage without involving an increase in size or an increase in complexity of the transport system. Further, according to the present invention, it is possible to perform the attitude conversion of the work or the like by driving a movable mechanism on the carriage even with a transport path that is curved with respect to the transport direction of a carriage, which allows for an increased flexibility in installation of the transport path, which is a track of the carriage. Therefore, according to the present invention, it is possible to easily configure a transport system that circulates a carriage to transport a work by using the curved transport path.

Further, while the case where the coil unit 207 is formed of a set of six coils has been described as an example in the above embodiments, the invention is not limited thereto. The coil unit 207 may be formed of only three coils for each phase instead of connecting two coils 206 for each phase in series, or may be formed of two or more in-phase coils being connected in series. Further, the coil unit 207 may be configured such that the current amount of each coil 206 can be controlled independently.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-098342, filed on May 17, 2017, which is hereby incorporated by reference herein in its entirety.

What is claimed is:

1. A transport system comprising:
   a plurality of coils; and
   a carriage that has a magnet and is movable in a first direction along the plurality of coils in accordance with electromagnetic force to which the magnet is subjected from the plurality of coils,
   wherein the carriage has:
   a part; and
   a movable mechanism that is provided so as to be able to interlock with the magnet and is driven to be relatively moved with respect to the part by electromagnetic force to which the magnet is subjected in a second direction intersecting with the first direction from the plurality of coils.

2. The transport system according to claim 1,
   wherein the carriage has a plurality of the magnets, and
   wherein the movable mechanism is provided so as to be able to interlock with some of the plurality of magnets.

3. The transport system according to claim 1,
   wherein the carriage has
   a top plate, and
   an elastic member provided between the top plate and the movable mechanism.

4. The transport system according to claim 1, wherein the magnet is movable in the second direction, and
   the transport system further comprising a control unit that controls currents applied to the plurality of coils based on a thrust constant that changes in accordance with a positon in the second direction of the magnet.

5. A transport system comprising:
   a plurality of coils; and
   a carriage that has a first magnet and a second magnet and is movable in a first direction along the plurality of coils by electromagnetic force to which the first magnet is subjected from the plurality of coils,
   wherein the carriage has:
   a part; and
   a movable mechanism that is provided so as to be able to interlock with the second magnet and is driven to be relatively moved with respect to the part by electromagnetic force to which the second magnet is subjected in the first direction from the plurality of coils and electromagnetic force to which the second magnet is subjected in a second direction intersecting with the first direction from the plurality of coils.

6. The transport system according to claim 5 further comprising a control unit that controls a position of the carriage,
   wherein the control unit calculates in advance electromagnetic force to which the second magnet is subjected in the first direction and, based on a result of the calculation, performs feedforward control on the position of the carriage.

7. The transport system according to claim 1, wherein the movable mechanism is a work holder that holds a work on the carriage.

8. The transport system according to claim 5, wherein the movable mechanism is a work holder that holds a work on the carriage.

9. A processing system comprising:
the transport system according to claim 1; and
a process apparatus that performs a processing operation on a work transported by the carriage.

10. A processing system comprising:
the transport system according to claim 5; and
a process apparatus that performs a processing operation on a work transported by the carriage.

11. A manufacturing method of an article, the manufacturing method comprising steps of:
providing a processing system comprising:
a transport system; and
a processing apparatus that performs a processing operation on a work, the transport system comprising:
a plurality of coils; and
a carriage that has a magnet and is movable in a first direction along the plurality of coils in accordance with electromagnetic force to which the magnet is subjected from the plurality of coils,
wherein the carriage has:
a part; and
a movable mechanism that is provided so as to be able to interlock with the magnet and is driven to be relatively moved with respect to the part by electromagnetic force to which the magnet is subjected in a second direction intersecting with the first direction from the plurality of coils;
transporting the work by the carriage; and
performing, by the processing apparatus, the processing operation on the work transported by the carriage.

12. A manufacturing method of an article, the manufacturing method comprising steps of:
providing a processing system comprising:
a transport system; and
a processing apparatus that performs a processing operation on a work, the transport system comprising:
a plurality of coils; and
a carriage that has a first magnet and a second magnet and is movable in a first direction along the plurality of coils by electromagnetic force to which the first magnet is subjected from the plurality of coils,
wherein the carriage has:
a part; and
a movable mechanism that is provided so as to be able to interlock with the second magnet and is driven to be relatively moved with respect to the part by electromagnetic force to which the second magnet is subjected in the first direction from the plurality of coils and electromagnetic force to which the second magnet is subjected in a second direction intersecting with the first direction from the plurality of coils;
transporting the work by the carriage; and
performing, by the processing apparatus, the processing operation on the work transported by the carriage.

13. A control method of a transport system, the control method comprising:
moving a carriage having a magnet in a first direction along a plurality of coils by electromagnetic force to which the magnet is subjected from the plurality of coils, the carriage having a part and a movable mechanism that is provided so as to be able to interlock with the magnet; and
driving the movable mechanism to be relatively moved with respect to the part by electromagnetic force to which the magnet is subjected in a second direction intersecting with the first direction from the plurality of coils.

14. A control method of a transport system, the control method comprising:
moving a carriage having a first magnet and a second magnet in a first direction along a plurality of coils by electromagnetic force to which the first magnet is subjected from the plurality of coils, the carriage having a part and a movable mechanism that is provided so as to be able to interlock with the second magnet; and
driving the movable mechanism to be relatively moved with respect to the part by electromagnetic force to which the second magnet is subjected in the first direction from the plurality of coils and electromagnetic force to which the second magnet is subjected in a second direction intersecting with the first direction from the plurality of coils.

* * * * *